(12) United States Patent
Skipton

(10) Patent No.: US 11,884,135 B2
(45) Date of Patent: Jan. 30, 2024

(54) AIR FILTRATION SYSTEM

(71) Applicant: DES Development LLC, Tomball, TX (US)

(72) Inventor: Don Skipton, Tomball, TX (US)

(73) Assignee: DES Developement LLC, Tomball, TX (US)

(*) Notice: Subject to any disclaimer, the term of this patent is extended or adjusted under 35 U.S.C. 154(b) by 564 days.

(21) Appl. No.: 17/143,707

(22) Filed: Jan. 7, 2021

(65) Prior Publication Data

US 2022/0212522 A1 Jul. 7, 2022

(51) Int. Cl.
*B60H 1/24* (2006.01)
*B01D 46/10* (2006.01)
*B01D 46/00* (2022.01)

(52) U.S. Cl.
CPC ......... *B60H 1/245* (2013.01); *B01D 46/0008* (2013.01); *B01D 46/10* (2013.01)

(58) Field of Classification Search
CPC .......... B60H 1/245; B60H 2001/00235; B60H 1/262; B60H 3/0658; B60H 2001/00242; B60H 1/00364; B60H 1/00535; B01D 46/0008; B01D 46/10; B01D 46/0002; B01D 46/00; F24F 13/28; F24F 7/003; F24F 8/108; F24F 7/02; F24F 1/0047; F24F 2221/16; F24F 1/0073; F24F 1/035; F24F 3/16; F24F 13/085; B60J 7/1642
See application file for complete search history.

(56) References Cited

U.S. PATENT DOCUMENTS

| 4,196,657 A | * | 4/1980 | Crongeyer | B60H 1/262 |
| | | | | 454/107 |
| 4,709,623 A | * | 12/1987 | Roth | B60H 1/00364 |
| | | | | 454/136 |
| 2018/0105020 A1 | * | 4/2018 | Smith | B60H 1/262 |
| 2018/0208022 A1 | * | 7/2018 | Caliskan | B60H 1/245 |
| 2019/0285294 A1 | * | 9/2019 | Bourque | B01D 46/00 |
| 2020/0215878 A1 | * | 7/2020 | Yun | B60H 3/0085 |
| 2021/0061060 A1 | * | 3/2021 | Meda | B60H 1/00535 |

FOREIGN PATENT DOCUMENTS

WO WO-2018024927 A1 * 2/2018 ............... E04B 1/61

OTHER PUBLICATIONS

English translation of WO-2018024927-A1, dated Sep. 29, 2023 (Year: 2023).*

* cited by examiner

*Primary Examiner* — Edelmira Bosques
*Assistant Examiner* — Brett Peterson Mallon
(74) *Attorney, Agent, or Firm* — Jeffrey L. Streets

(57) ABSTRACT

An air filtration system for a mobile unit having a vent fan and a kit for forming the air filtration system. The air filtration system includes a rigid outer cover made, a filter box, and a vent fan installed on a roof of the mobile unit. An air inlet passageway is formed in the rigid outer cover so that the vent fan may draw outside air through the filter box and into an interior space of the mobile unit. The air inlet passageway may include a louver for allowing air entry while protecting the filter box from rainwater. A base plate has a central opening that is positionable around a vent fan housing and securable to a vent fan flange to form a flat surface upon which to receive the filter box and the rigid outer cover.

18 Claims, 12 Drawing Sheets

AIR FILTRATION SYSTEM

BACKGROUND

The present disclosure relates to an air filtration system for removing airborne solids from air that is being drawn into an interior space of a mobile unit, such as a recreational vehicle.

BACKGROUND OF THE RELATED ART

Mobile units, such as recreational vehicles, motorhomes, campers, and enclosed trailers, typically use one or more large vent fans to circulate air through an interior space for living, working, cooking or other activity. Typically, one or more vent fans are used to force large volumes of air out of the interior space through the ceiling, which causes a slight negative pressure that pulls air into the interior space through any of the available openings. These available openings may include screened windows and doors as well as unscreened gaps around slide outs and entry points for wiring and plumbing. If the mobile unit is located in an area having air with significant amounts of airborne solids, then the fans draw the airborne solids into the interior space along with the air. The airborne solids may include dust, bugs and pollen. Once inside the interior space, the airborne solids may be inhaled by individuals present within the interior space, perhaps causing allergies or other breathing difficulties. Furthermore, the airborne solids may accumulate on surfaces within the interior space. The interior space may be difficult to clean due a large number of nooks and crannies or other features suitable to the mobile unit.

BRIEF SUMMARY

Some embodiments provide an air filtration system for a mobile unit having a vent fan. The air filtration system comprises a rigid outer cover and a filter box. The rigid outer cover includes four rigid sidewalls, a rigid top and an open bottom, wherein each of the four rigid sidewalls have a bottom edge that is secureable to the mobile unit around a perimeter of the vent fan with the rigid top extending over the vent fan. At least one of the four rigid sidewalls includes an air inlet passageway. The filter box includes five rectangular air filters secured together in the shape of a box having four filter sidewalls and a filter top. The filter box has an open bottom so that the four filter sidewalls are positionable around the perimeter of the vent fan with the filter top extending over the vent fan, wherein the filter box is configured to avoid interfering with opening and closing of a vent fan cover that is coupled to the vent fan. The rigid outer cover can be opened for receiving the filter box and can be securely closed to retain the filter box in an operable position. The rigid outer cover is configured to extend over and around the filter box leaving an air flow space surrounding the filter box with the filter box in the operable position, with the rigid outer cover secured to the mobile unit, and with the rigid outer cover securely closed.

Some embodiments provide a kit for forming an air filtration system for a mobile unit having a vent fan. The kit comprises a foldable net including four sidewall panels of a rigid outer cover and four lower tabs, wherein the foldable net includes an aluminum composite panel having a plurality of grooves that establish fold lines for forming the rigid outer cover, and wherein at least one of the four sidewall panels includes an opening that forms an air inlet passageway. The kit further comprises a top panel securable to each of the four sidewall panels and a base plate having a central opening that is positionable around a perimeter of the vent fan. The kit still further comprises a first set of fasteners for securing the four lower tabs to the base plate and securing the base plate to the mobile unit, a second set of fasteners for securing the top panel to the four sidewall panels, and an elastomeric material that conforms to a surface of the mobile unit around the vent fan and the base plate.

DETAILED DESCRIPTION

Figure 1:
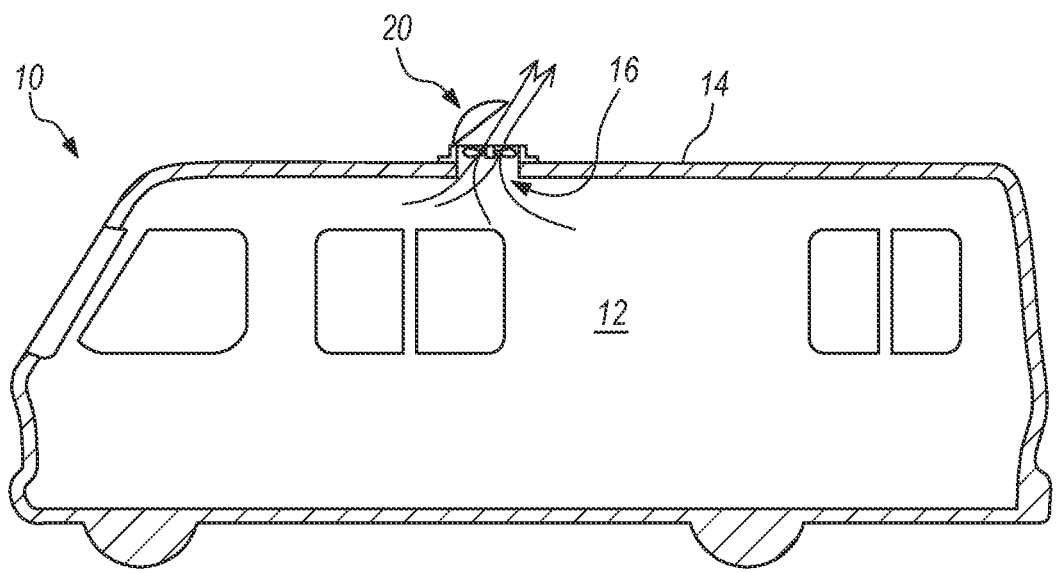
FIG. 1 is a schematic diagram illustrating an interior space of a mobile unit having a vent fan in the ceiling of the mobile unit.

Some embodiments provide an air filtration system for a mobile unit having a vent fan. The air filtration system comprises a rigid outer cover and a filter box. The rigid outer cover includes four rigid sidewall panels, a rigid top panel and an open bottom, wherein each of the four rigid sidewall panels have a bottom edge that is secureable to the mobile unit around a perimeter of the vent fan with the rigid top panel extending over the vent fan. At least one of the four rigid sidewall panels includes an air inlet passageway. The filter box includes five rectangular air filters secured together in the shape of a box having four filter sidewalls and a filter top. The filter box has an open bottom so that the four filter sidewalls are positionable around the perimeter of the vent fan with the filter top extending over the vent fan, wherein the filter box is configured to avoid interfering with opening and closing of a vent fan cover that is coupled to the vent fan. The rigid outer cover can be opened for receiving the filter box and can be securely closed to retain the filter box in an operable position. The rigid outer cover is configured to extend over and around the filter box leaving an air flow space surrounding the filter box with the filter box in the operable position, with the rigid outer cover secured to the mobile unit, and with the rigid outer cover securely closed.

The mobile unit may be any type of vehicle, trailer, container or pod, without limitation, that may have, or be made to have, a vent fan that moves air between an interior space of the mobile unit and the surrounding environment. Specific, non-limiting examples of the mobile unit include a recreational vehicle, camping trailer, delivery truck or van, work truck, construction shed and food truck.

The vent fan may be a vent fan that is already installed for exhausting air from the interior space of the mobile unit. Alternatively, the vent fan may be newly installed specifically for the purpose of drawing air through the filters without regard to any previously installed vent fans. One advantage of installing a new vent fan for use in combination with the filter box is that the location of the vent fan may be selected for optimal installation, operation and maintenance of the filter box. However, mobile units may have any number of vent fans. For example, an enclosed trailer may have at least one vent fan, a medium sized motorhome or camper trailer may have two vent fans, and a large motorhome or camper may have 3 to 4 vent fans. One of the air filtering systems described herein may be installed for each of the vent fans or for at least one vent fan.

The vent fan may be a rotary fan that is operated so that the fan motor rotates one or more fan blades in a direction that draws outside air through the filter box and then into the interior space. If the vent fan is not prewired for rotation in this direction or is not equipped with a controller or switch for causing rotation in this direction, then the two wires supplying electrical power to the fan motor may be reversed.

In some embodiments, the air filtration system may be used with a vent fan having any of a wide variety of sizes, types and features. For example, a vent fan may include, or work in combination with, a rain sensor that causes a vent fan cover to close over the vent fan in response to detecting rain. Specifically, a hinged vent fan cover may be automatically actuated between an open position and a closed position in response to sensor input indicating the presence of rain. Some embodiments of the air filtration system may facilitate continued use of this feature or other automatic features. A standard vent fan on top of mobile unit may be designed to open the vent fan cover whenever the fan is turned on and to close the vent fan cover whenever the fan is turned off. In another example, a hinged vent fan cover may be automatically actuated between the open position and the closed position in response to sensor input indicating an air temperature within the living space that is greater than or less than a reference temperature.

The base plate is preferably flat and has a central opening that is positionable around a perimeter of the vent fan housing and over a top of the perimeter flange. The flat base plate is secureable to the mobile unit with screws having a length to extend through the flat base plate, through the perimeter flange, and into the roof of the mobile unit. An elastomeric material is preferably applied to the top of the perimeter flange before positioning the base plate over the perimeter flange, such that any gaps between the perimeter flange and the base plate are sealed. To the extent that the base plate may extend beyond the perimeter flange, the elastomeric material may also be applied to the roof of the mobile unit in a thickness sufficient to fill the gap between the roof and the base plate. The base plate preferably provides a flat upper surface about a perimeter of the vent fan for receiving the filter box and the rigid outer cover. In one option, a lower edge of the filter box may sit flush against the flat upper surface of the base plate. The base plate is preferably secured with screws having a flat countersunk head so that there are no screw heads extending upward from the flat upper surface of the base plate.

In some embodiments, the rigid outer cover or box may be hinged to the base plate and moveable between a closed position for protecting the filter box and an open position for replacing the filter box. The rigid outer cover or box may be secured to the base plate with one or more hinge along one of the edges of the rigid outer cover, preferably along a front edge of the rigid outer cover relative to the front of the mobile unit. The rigid outer cover may then be latched along another one of the edges, such as along an edge that is opposite to the hinged edge. Accordingly, the rigid outer cover may be secured in a close position to secure and protect the filter box, and the rigid outer cover may be selectively moved to an open position to install or replace the filter box.

The rigid outer cover may be made in various shapes, sizes and material. However, the rigid outer cover must be of sufficient size and shape to receive and secure the air filter in a manner that neither the rigid outer cover nor the air filter interferes with operation of the vent fan cover. The rigid outer cover may be made from any material or composition that is able to withstand high velocity wind and rain as would be experienced on a roof top during a wide range of weather conditions, either with the mobile unit in a stationary condition or driving at highway speeds. As non-limiting examples, the rigid outer cover may be made from a wide range of polymers, polymer mixture or composites, fiberglass, sheet metal, aluminum composite panels, and combinations of these materials.

In some embodiments, the rigid outer cover may be formed with an aluminum composite panel including a first aluminum sheet, a second aluminum sheet, and a polymeric core secured between the first and second aluminum sheets. An aluminum composite panel has less weight than a solid metal panel of similar thickness, yet is rigid, durable and resistant to sunlight and weather conditions. The aluminum composite panel (ACP), which may also be referred to as aluminum composite material (ACM), may be cut to various dimensions by cutting through all three layers (i.e., aluminum-core-aluminum) and may be cut to form fold lines by cutting a linear groove through one aluminum sheet/layer and a major portion of the thickness of polymeric core. These types of cuts, including interior cutouts of windows or air passageways, may be made with a computer numerical control (CNC) machine (also referred to as a CNC router) under the control of a computer. A computer-controlled CNC machine provides both high precision cutting and low manufacturing costs. The computer may execute program instructions to cause the CNC machine to form various parts, such as the net for the rigid outer cover sidewalls, lid and/or base plate. The CNC machine may make cuts through the entire thickness of the aluminum composite panel along the outline of each part and/or any cut-outs (i.e., holes, windows, openings, or ports) within each part. Fold lines may be formed by cutting a groove through a portion of the aluminum composite panel thickness, such as through a first aluminum sheet and a major portion of the polymeric core. Each fold line may be formed by cutting a groove in the interior face of the aluminum composite panel, either to enable an inside corner or an outside corner.

The foldable net is an arrangement of non-overlapping edge-joined polygons in a plane which can be folded along the linear grooves (which form a joined edge between the panels) to become faces of the rigid outer cover. In some embodiments, the foldable net includes only a portion of the faces that are needed to complete a five-sided rigid outer cover with an open bottom. For example, embodiments may include a foldable net that forms only the four lateral sidewall panels or faces of the rigid outer cover. In such embodiments, the top panel may be a separate component that requires connection to the four lateral sidewall panels. Forming a net of some portion of the rigid outer cover allows multiple sides of the rigid outer cover to be made from a single sheet, such as a net that includes the four lateral sidewall panels of the rigid outer cover.

In some embodiments, the rigid top panel may be detachably secured to the four rigid sidewalls with a plurality of fasteners, such as screws. In one option, the four rigid sidewall panels may each include an upper tab, such that the fasteners may secure the rigid top panel to each of the upper tabs. In another option, the rigid outer cover may include a hinge coupled between the rigid top panel and a first rigid sidewall panel of the four rigid sidewall panels for moving the rigid top panel between a closed position and an open position, wherein the rigid outer cover includes a latch coupled between the rigid top panel and a second rigid sidewall panel of the four rigid sidewall panels for detachably securing the rigid top panel in the closed position. In a further option, the rigid top panel may be secured to the four rigid sidewalls using four angle bars. Each angle bar may be an elongate bar of metal or rigid plastic having a pair of legs that extend apart at a 90-degree angle to form an L-shaped cross-sectional profile. For each of the four rigid sidewalls, a first leg of an angle bar is secured to the rigid sidewall with the second leg flush with an upper edge of the rigid sidewall panel, such that the second leg forms an upward-facing ledge for receiving the top panel. The top panel may then be detachably attached to the angle bars, such as using a set of screws. An optional gasket or seal may be disposed over the upper edge of the four sidewall panels and/or the angle bars to prevent water intrusion into the rigid outer cover.

In some embodiments, the rigid outer cover may be formed by two foldable nets, wherein both foldable nets include multiple panels, and wherein the two foldable nets are used collectively to form the rigid outer cover. For example, a first foldable net may form a front sidewall panel, a left sidewall panel, and a right sidewall panel, while a second foldable net may form a top panel and a back sidewall panel. Optionally, the front, left and right sidewall panels of the first foldable net may include lower tabs for securing the front, left and right sidewall panels to the base plate, while the top and back sidewall panels of the second foldable net are detachably coupled to the front, left and right sidewall panels. One or both panels of the second foldable net may be detached in order to receive a filter box therein. In one option, the top panel of the second foldable net may be detached while the back sidewall panel of the second foldable net remains attached, such that the fold line between the top panel and the back sidewall panel may service as a hinge.

Some embodiments of the rigid outer cover include any number, size and location of air inlet passageways. In one option, the rigid outer cover has a back-facing side with an air inlet passageway with or without additional air inlet passageways on the lateral sides of the rigid outer cover. Accordingly, some embodiments will not include an air inlet passageway on the front side of the rigid outer cover relative to the front of the mobile unit. While the inclusion of a greater number of air inlet passageways may improve air flow into the rigid outer cover, air inlet passageways in the back-facing side and, to a lesser extent, the lateral sides of the rigid outer cover will be more protected from high velocity air flow and rain as the mobile unit is driven in a forward direction. Of course, a rigid outer cover having a complex, irregular or not rectangular shape may air inlet passageways that are directed at various angles and directions, but those facing more backward (rearward) and/or more downward may be preferred.

In some embodiments, the filter box may be configured to fit over the top of the vent fan without interfering with opening and closing of a vent fan cover. For example, the vent fan lid may be hingedly coupled to a vent fan housing and may be automatically or manually actuated between a closed position that prevents air circulation and/or rain entry into the interior space and an open position that enables air circulation into the interior space. Accordingly, the dimensions of the filter box may be affected by the width and length of the vent fan, as well as the height of the vent fan cover above the surface of the mobile unit when the vent fan cover is fully open. The rigid outer cover may be configured to fit over or enclose the filter box without closing off any of the surface area of the filter box. In other words, the rigid outer cover may have a greater height than the filter box, a greater width than the filter box, and a greater length than the filter box.

In some embodiments, the air filters may have pleated filter media, such that the effective surface area of the filter is greater than the planar dimensions of the air filter. The large amount of surface area provided by the filter box may enable a large volume of air to pass through the filter box and into the interior space. Furthermore, the large amount of surface area may a greater capacity for trapping particulate or solids and may, therefore, reduce the frequency at which the filter box must be replaced. Optionally, one or more of the air filters could be replaced with a cardboard blank so long as the filter box has at least one air filter with sufficient surface area to support continuous operation of the vent fan. Operating the vent fan in a reverse direction causes an inward air flow direction through the filter box and vent fan before the air enters the interior space of the mobile unit. Accordingly, the interior space receives filtered air that is placed in a "positive pressure" condition so that the filtered air then exits the interior space through screened and unscreened openings. As a result, airborne matter outside the mobile unit is generally prevented from gaining entry into the interior space through any of the screened or unscreened openings.

In some embodiments, the air filtration system may have a rigid outer cover in the form of a rigid outer box that supports the use of a filter box. The filter box may include five rectangular air filters, each air filter having a frame extending around the rectangular perimeter of the air filter, and an amount of double-sided tape for securing the frames of adjacent air filters arranged as a filter box having four lateral sides formed with four of the air filters, a top formed with one of the air filters, and an open bottom. Each of the five rectangular air filters are preferably oriented for an air flow direction from outside the filter box to inside the filter box. The air filters may be a standard household type of air filter, such as an air filter having a pleated filter media secured in a cardboard frame. The air filters preferably have the same nominal dimensions, model number and/or product identifier such as a stock keeping unit (SKU). An air filter with a cardboard frame may further include a cardboard lattice extending across one or both faces of the filter media to help retain the filter media and to provide additional structural integrity to the cardboard frame. Still further, an air filter may include a metal or plastic mesh positioned on a downstream side of the filter media to provide further support for the filter media to oppose the forces associated with airflow passing through the filter media. In some embodiments, the foregoing five rectangular air filters and fasteners, such as double-sided tape, may be included in a kit that is separate from the kit that forms the rigid outer cover.

In some embodiments, each of the air filters in a filter box may have a cardboard frame that is secured to a cardboard frame of an adjacent one of the air filters. For example, the cardboard frame of each of the air filters may have a flat surface that is positioned flush with a flat surface of the cardboard frame of each adjacent air filter, wherein the cardboard frames may be secured together with double-sided tape and/or other fasteners.

In some embodiments, the air filtration system may accommodate and/or include multi-stage filter media such as two or more nested filter boxes, where each inner filter box fits within an adjacent outer filter box. An air gap may be provided between each of the nested filter boxes, but the presence of an air fap is not required. In one example, a first (outer) filter box fits inside the rigid outer cover and causes all of the air flow caused by the vent fan to pass through the first filter box. A second (inner) filter box fits inside the first (outer) filter box such that all of the air flow through the first (outer) filter box will then pass through the second (inner) filter box. An optional third (middle) filter box may fit between the first (outer) filter box and the second (inner) filter box, such that all of the air flow between the first and second filter boxes will pass through the third (middle) filter box. Each of the nested filter boxes may be made with the same or different air filters, such as the same or different filter media type and/or rating. For example, three nested filter boxes may include an outer filter box having a first filter type and/or rating, a middle filter box having a second filter type and/or rating, and an inner filter box having a third filter type and/or rating. Specifically, each filter box may have a plurality of parameters independently selected from disposable filters, reusable (washable) filters, electrostatic filters, antiviral filter media, pleated or fibrous media, various particle removal dimensions or ratings (i.e., MERV, HEPA, etc.), and the like. In one option, the outer-most filter box may have a low MERV rating and each successive inner filter box may have a higher MERV rating than the immediately adjacent filter box on the outside of the filter box. Furthermore, each of the nested filter boxes will have different dimensions, and the nested filter boxes may be made with rectangular air filters that are either square or non-square.

In some embodiments, the foldable net may include an end tab that is foldably connected to a first sidewall panel of the four sidewall panels for forming a lap joint with an edge of a fourth sidewall panel of the four sidewall panels, wherein the first sidewall panel and the fourth sidewall panel are the furthest apart of the four sidewall panels in the net when laying flat. The lap joint may include the end tab being folded to a 90 degree angle with the first sidewall panel to lay flat against a face of the fourth sidewall panel, where a third set of fasteners may be included in a kit for securing the end tab and fourth sidewall panel in a face-to-face connection. If the end tab is to be connected to an inner face of the fourth sidewall panel, then the first sidewall panel may be shorter than the second, third and fourth sidewall panels in order to form a more rectangular rigid outer cover. Alternatively, if the end tab is to be connected to an outer face of the fourth sidewall panel, then the first sidewall panel may be longer than the second, third and fourth sidewall panels in order to form more rectangular rigid outer cover. In one option, the end tab may include a first plurality of holes and the fourth sidewall panel may include a second plurality of holes alignable with the first plurality of holes with the net folded into the form of the rigid outer cover. Some embodiments of the kit may further include a plurality of fasteners for securing the end tab and the fourth sidewall panel together. For example, the plurality of fasteners may be a plurality of pop rivets, where each pop rivet has a first head and a shaft that is extendable through one of the first plurality of holes and an aligned one of the second plurality of holes. The pop rivet has a distal end of the shaft that is deformable to form a second head, such that the pop rivet secures the end tab to the fourth sidewall panel.

In some embodiments, the opening in the at least one of the four sidewall panels may include a louver. A louver is a set of horizontal slats that are angled downwardly and outwardly to admit air, but to keep out rain. The angle of the slats may be adjustable but is preferably fixed. Optionally, the louver may be those of a standard home soffit vent.

In some embodiments, each of the four lower tabs is connected to a separate one of the four sidewall panels. For each of the four lower tabs, one of the plurality of grooves forms a fold line between the lower tab and the separate one of the four sidewall panels to which the lower tab is connected. The grooves that form the fold line between each lower tab and a sidewall panel are preferably formed on the same side of the net as the grooves that form the fold line between each of the four sidewall panels and the end tab. Accordingly, each of the four lower tabs may be inwardly foldable to form an inwardly directed tab for face-to-face coupling to the base plate. Alternatively, the grooves could be formed on the opposing side of the net, such that the lower tabs each fold outwardly.

In some embodiments, the elastomeric material is provided in an amount sufficient for sealing the base plate to an exterior surface of the mobile unit even if the base plate is planar and the exterior surface of the mobile unit is convex. The elastomeric material may be in the form of a gasket or may be a spreadable material. A spreadable elastomeric material may be spread with a putty knife and dispensed from a cartridge using a caulk gun. The seal between the base plate and the exterior surface of the mobile unit is preferably a water-tight seal. A non-limiting example of the elastomeric material includes silicone rubber.

In some embodiments, the air filtration system may further include an air filter that is downstream of the vent fan. For example, the downstream air filter may be positioned over the outlet of the vent fan, which is on an opposing side of the vent fan from the air filter box. In one option, the downstream air filter may be disposed within the interior space of the mobile unit. The downstream air filter may be secured in a molded plastic secondary filter housing that is aligned with the opening in the mobile unit and is attached to the ceiling of the mobile unit or a portion of the vent fan housing that is secured to the roof of the mobile unit. An air filter element may be replaceably secured within the secondary filter housing. For example, the secondary filter housing may have a slot with port, or a cover or door that hinges downwardly from the ceiling, so that a dirty air filter may be quickly removed and a replacement air filter may be quickly installed.

In some embodiments, the air filter box may have a first filtering effectiveness level and the downstream air filter may have a second filtering effectiveness level. While the first and second filtering effectiveness levels may be the same, one preferred implementation include the second filtering effectiveness level being greater than the first filtering effectiveness level. In this preferred implementation, the air filter box may serve as a prefilter to remove large particulate materials, such as dust, fibers, pollen and bugs, and the downstream air filter may serve as a secondary filter to remove fine particulate materials, such as mold spores, auto emission particulates, etc. Furthermore, the louvered screen prevents rain, large bugs, rocks, leaves and the like from even reaching the air filter box.

One suitable identifier of a filtering effectiveness level may be assigned to an air filter under the "Minimum Efficiency Reporting Value" (MERV) standard. The MERV scale was developed by the American Sociated of Heating, Refrigerating and Air-Conditioning Engineers (ASHRAE). Another suitable identifier of a filtering effectiveness level may be assigned to an air filter under the "High-Efficiency Particulate Air" (HEPA) standard. A numerical or alphanumerical rating under either and/or both of these standards, or other similar standards, may be used for comparison of filtering effectiveness levels of various air filters.

In some embodiments, the air filtration system may beneficially reduce the amount of airborne particulates or solids being drawn into an interior space of a mobile unit. Accordingly, some embodiments of the air filtration system may provide air with fewer airborne particulates, such that the interior space may stay cleaner and the air may cause fewer allergies or other symptoms for an individual spending time within the interior space. Without limitation, airborne particulates such as dust, mold and pollen may cause allergies when inhaled into the respiratory system of an individual or when coming into contact with the eyes of the individual. The air filtration system of some embodiments may enable a mobile unit to be used by individuals that would be unable to use the mobile unit without such an air filtering system. Similarly, a mobile unit that is equipped with the air filtration system of some embodiments may be more valuable than a similar mobile unit that is not equipped with such an air filtering system.

Some embodiments provide a kit for assembling and installing an air filtration system for a mobile unit having a vent fan. The kit may include a foldable net including four sidewall panels of a rigid outer cover and four lower tabs, wherein the foldable net includes an aluminum composite panel having a plurality of grooves that establish fold lines for forming the rigid outer cover, and wherein at least one of the four sidewall panels includes an opening that forms an air inlet passageway. The kit may further include a top panel securable to each of the four sidewall panels and a base plate having a central opening that is positionable around a perimeter of the vent fan. The kit may still further include an elastomeric material that conforms to a surface of the mobile unit around the vent fan and the base plate, a first set of fasteners for securing the four lower tabs to the base plate and securing the base plate to the mobile unit, and a second set of fasteners for securing the top panel to the four sidewall panels.

In some embodiments, the kit may further include five rectangular air filters, each air filter having a frame extending around the rectangular perimeter of the air filter, and an amount of double-sided tape for securing the frames of adjacent air filters arranged as a filter box having four lateral sides formed with four of the air filters, a top formed with one of the air filters, and an open bottom.

In some embodiments, the air filtration kit may be contained in packaging for storage and/or shipment to an end user in a flat or collapsed condition for the end user to fold out into an expanded condition for assembly, installation and use in conjunction with a vent fan of a mobile unit. The foldable net may be packaged and/or shipped in a flat configuration, either a single-layer flat net or a multilayer partially folded flat configuration rather than an operative open box configuration. An end user may then fold either the single-layer flat net or the multilayer partially folded flat configuration to form some or all of the operative open box configuration. In a further alternative, the end tab may be pre-secured to one of the side panels to form the four lateral sidewalls of the air box, yet the four sidewalls may be collapsed to a partially folded condition having the thickness of 2-3 panels. Storing and/or shipping the net in a flat unfolded condition and/or a partially folded condition with the end tab secured or not secured to one of the side panels may significantly reduce the cost of storage and/or shipment of small quantities of the net.

Some embodiments may further include printed instructions for assembling the parts of the kit into a component of the air filter system and/or installation of the component, or a uniform resource locator (URL) for obtaining equivalent instructions via a wide area network (WAN) such as the Internet. Optionally, any kit may further include instructions, or a link to instructions, for purchasing any parts or components that are not included in the kit or repurchasing any of the parts or components that have become worn out or consumed through use. For example, the filter box will become full of debris over time and will need to be periodically replaced, such that the kit may include instructions or links for repurchasing the air filters necessary to assemble a replacement filter box.

A mobile unit dealer or an individual owner of a mobile unit may assemble and install the air filtration system on the mobile unit. Some embodiments may require very few tools, such as a tool to use the fasteners. If a kit has fasteners in the form of rivets, then a rivet gun may be required. If a kit has fasteners in the form of screws, then a screwdriver may be required. If a kit has fasteners in the form of nuts and bolts, then a wrench may be required. Other types of fasteners may be used in assembling an air filtration system and may be included in a kit, such that a tool appropriate to the fastener may be required. Still further, some embodiments of a kit may include one or more fastener types and may or may not include the one or more tool necessary to utilize the one or more fastener types in the assembly and installation of the one or more components of the kit.

Some embodiments of the air filtration kit may include any component, feature or aspect of any one of the air filtration system embodiments described herein and/or any air filtration system embodiment may include any component, feature or aspect of any one of the air filtration kit embodiments described herein.

FIG. 1 is a schematic diagram illustrating an interior space 12 of a mobile unit 10 having a vent fan 20 on the roof 14 of the mobile unit. The vent fan 20 typically draws air from the interior space 12 through an opening 16, before exhausting the air into the surrounding environment. Therefore, the vent fan 20 may produce a slight negative pressure in the interior space 12 which draws air into the interior space 12 through any available opening in the mobile unit 10, such as through gaps around doors, windows, and penetrations for electrical, structural and/or plumbing systems. As a result of this air being drawn into the interior space 12, airborne solids in the air surrounding the mobile unit 10 are also drawn into the interior space 12. The air within the interior space 12 may therefore contain a variety of solids that can cause allergies, breathing difficulties, and solids deposition through the interior space 12.

Figure 2:
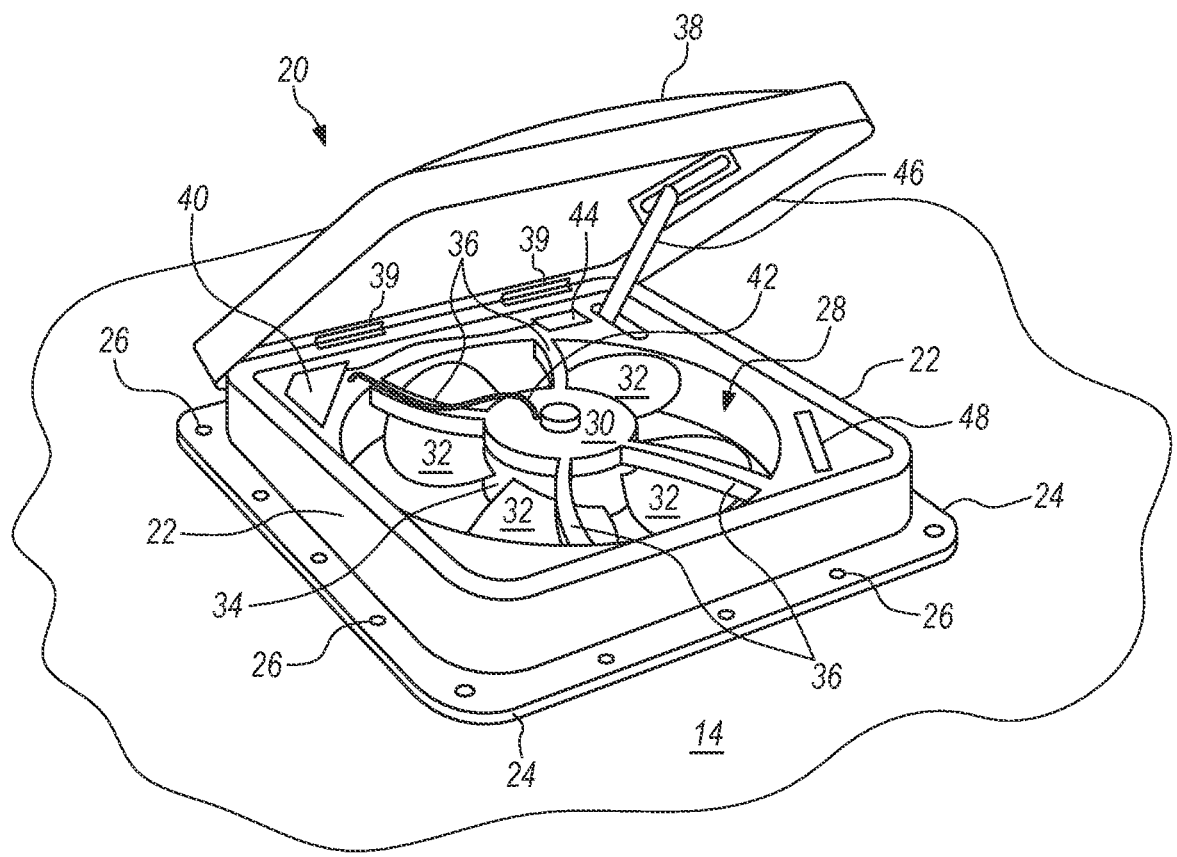
FIG. 2 is a perspective view of the vent fan.

FIG. 2 is a perspective view of the vent fan 20 as viewed from above the mobile unit. The vent fan may include a housing 22 having a flange 24 with holes 26. A set of screws may be run though the holes 26 and into the roof 14 to secure the vent fan 20 in place. The housing 22 has a central opening 28 where a fan motor 30 and fan blades 32 are supported and used. While the fan blades 32 are supported by a hub 34 that is coupled to the fan motor 30. The fan motor 30 is secured by a set of mounting arms 36 (four shown) that extend inwardly from the housing 22 and support the fan motor 30 within the central opening 28 without blocking air flow through the central opening 28. The vent fan 20 also include a vent fan cover 38 that is coupled to the housing 22 by hinges 39.

The vent fan 20 further includes a controller 40 that receives electrical power from an electrical power system 19 (see FIG. 3) of the mobile unit. Accordingly, the controller 40 may control the amount of power delivered to the fan motor 30 via a pair of wires 42. The controller may also control the operation of an actuator motor 44 to cause a lever arm 46 to open the vent fan cover 38 when the fan motor 30 is to be used and to close the vent fan cover 38 under various other conditions. In one example, the vent fan 20 may also include a rain sensor 48 that is wired to the controller 40 (wiring not shown), such that the controller 40 may cause the actuator motor 44 to close the vent fan cover 38 in response to the rain sensor 48 detecting the presence of rain.

Figure 3:
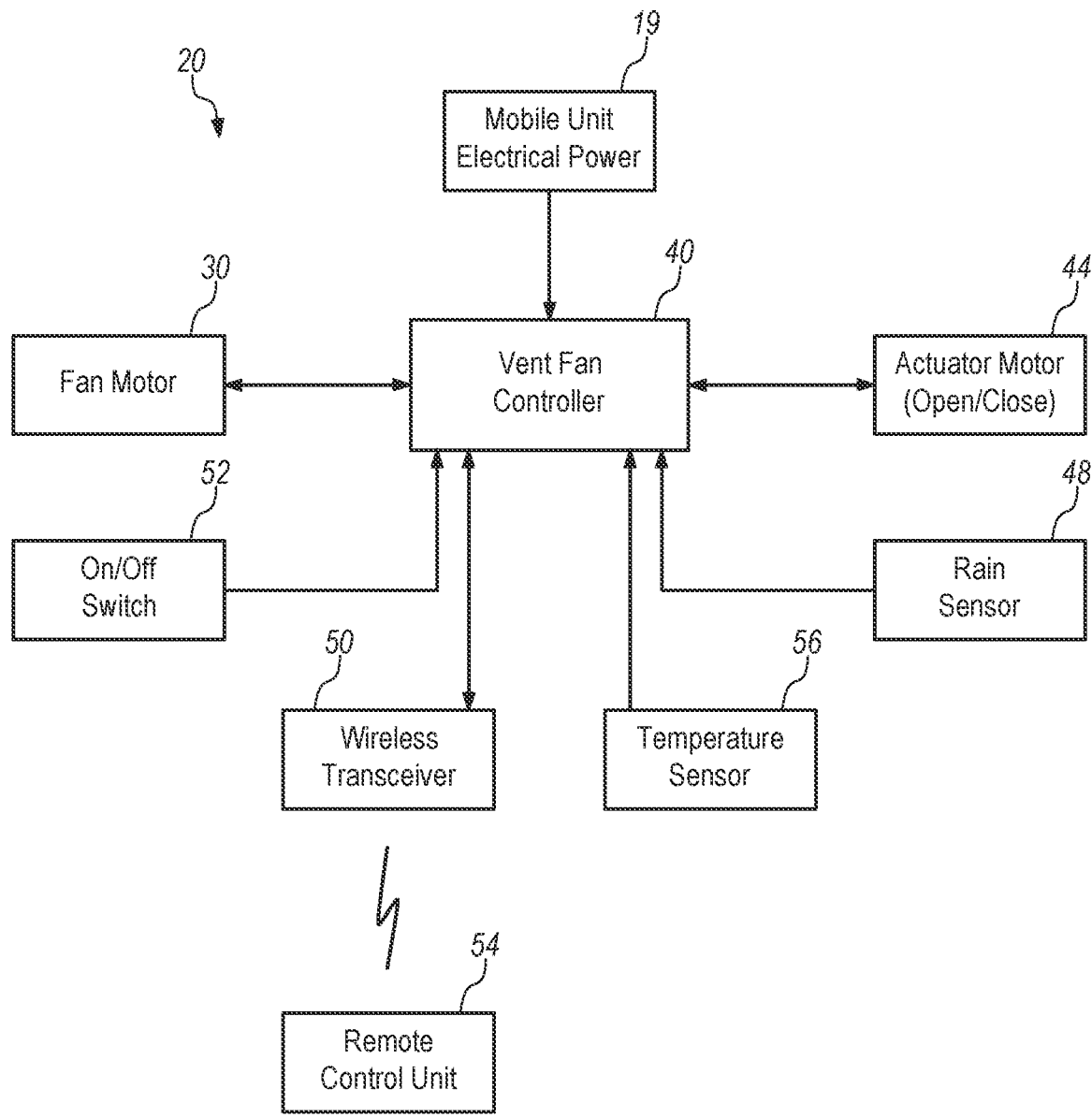
FIG. 3 is a block diagram of electronic components of the vent fan.

FIG. 3 is a block diagram of electronic components of the vent fan 20 according to some embodiments. The vent fan 20 includes the vent fan controller 40 that controls the operation of the fan motor 30, the actuator motor 44, and a wireless transceiver 50. The vent fan controller 40 receives electrical current from the electrical power system 19 of the mobile unit and may use that electrical current for its own operation as well as supplying electrical power to the fan motor 30, the actuator motor 44, and a wireless transceiver 50. In addition to electrical power, the vent fan controller 40 may also provide control signals and/or receive control signals from the fan motor 30, the actuator motor 44, and the wireless transceiver 50. An on/off switch 52 may be used to turn on the vent fan controller 40. Furthermore, a rain sensor 48 may provide a signal to the vent fan controller 40 in response to detecting rain. For example, the vent fan controller 40 may turn off the fan motor 30 and cause the actuator motor 44 to close the vent fan cover. Still further, a temperature sensor 56 may be provided, either as part of the vent fan 20 or merely in communication with the vent fan controller 40, to enable some form of temperature control. For example, the vent fan controller 40 may operate the actuator motor 44 to open the vent fan cover and operate the fan motor 30 to circulate air through the interior space of the mobile unit in response to receiving a signal from the temperature sensor 56 indicating a measured air temperature.

The wireless transceiver 50 of the vent fan 20 may communicate with a remote-control unit 54, which allows the user to interface with the vent fan controller 40. The remote-control unit 54 may include various buttons that are each associated with a unique function of the vent fan 20, such as a fan speed (i.e., low, medium, high), a vent fan cover position (i.e., open/close), and the like. However, the remote-control unit 54 may include various multipurpose buttons, such as a keypad (i.e., numbers 0-9), for entering numerical codes that are each associated with a particular function of the vent fan 20. For example, the remote control unit 54 may be used to input a temperature setpoint to the vent fan controller 40, and the vent fan controller 40 may operate the actuator motor 44 to open the vent fan cover and operate the fan motor 30 to circulate air through the interior space of the mobile unit in response to receiving a measured air temperature signal from the temperature sensor 56 indicating that an air temperature that is greater than the temperature setpoint.

Figure 4A:
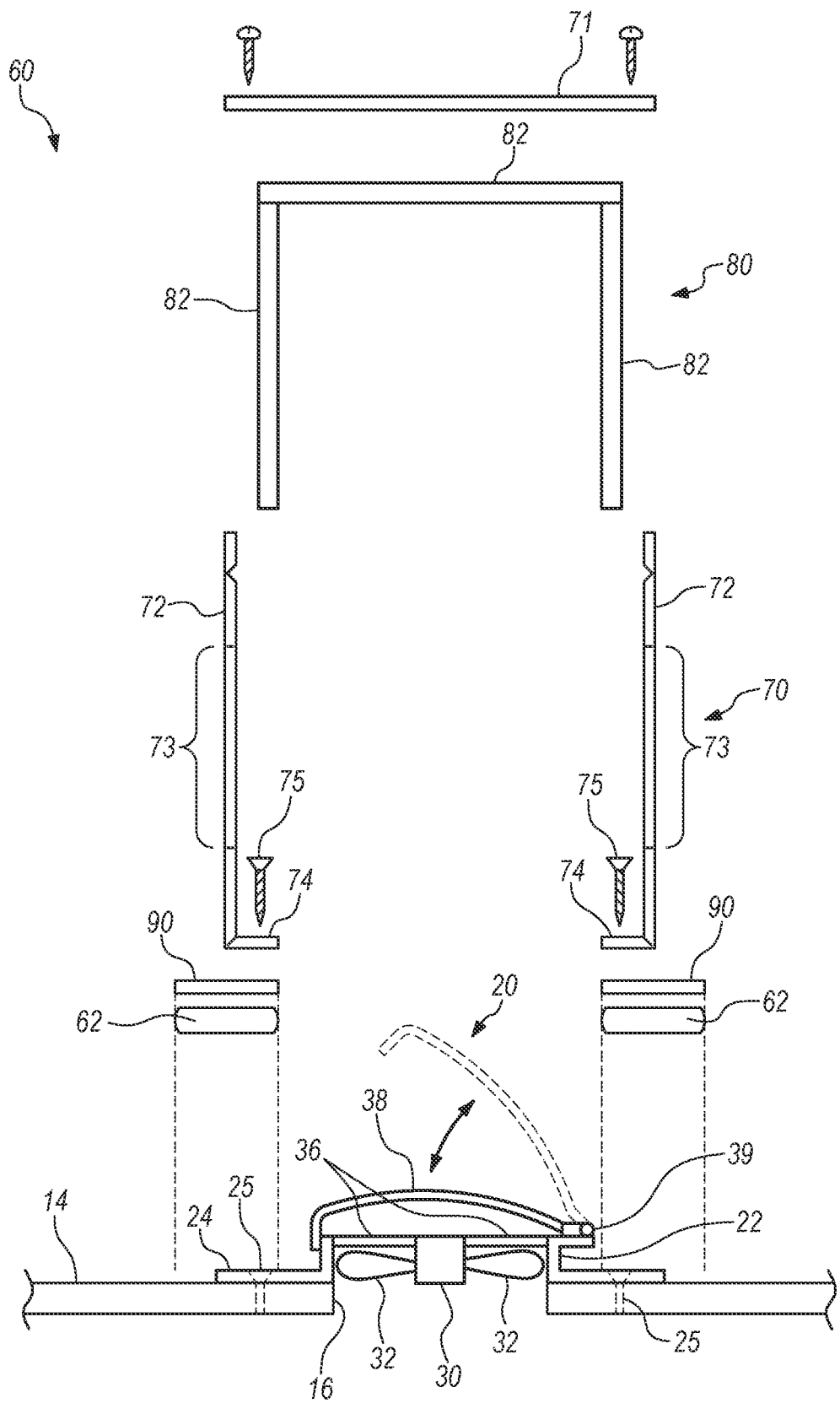
FIG. 4A is an exploded schematic side view of an air filtration system compatible with the vent fan

FIG. 4A is an exploded schematic side view of an air filtration system 60 that is compatible with the vent fan 20 of a mobile unit. For example, the vent fan 20 may be substantially as shown in FIGS. 1-3, including the housing 22 having the flange 24 secured to the roof 14 in alignment with the opening 16. A set of screws 25 are shown to extend through the flange 24 and into the roof 14 of the mobile unit at any number of points around a perimeter of the flange. The housing 22 supports the mounting arms 36 that position the motor 30 in alignment with the opening 16. A vent fan cover 38 is also coupled to the housing 22 by a hinge 39, such that the vent fan cover 38 may be hingeably moved between a closed position relative to the housing 22 (shown in solid lines) and an open position relative to the housing 22 (shown in dashed lines) by an actuator motor 44 (see FIGS. 2 and 3). In order to use the vent fan 20 in conjunction with the air filtration system 60, the vent fan cover 38 should be in the open position and the fan motor 30 should be energized to rotate in a direction that causes the fan blades 32 to draw air from the surrounding environment outside the mobile unit (i.e., above the roof 14) through the opening 16 into the interior space (i.e., below the roof 14).

The air filtration system 60 includes a rigid outer cover 70 and a filter box 80. The rigid outer cover 70 includes rigid sidewall panels 72 (two opposing sidewall panels shown), a rigid top panel 71 and an open bottom. Each of the sidewall panels 72 have a bottom edge, such as a lower tab 74 that is secureable to the roof 14 of the mobile unit around a perimeter of the vent fan 20 with the rigid top panel 71 extending over the vent fan 20. For example, a set of screws 75 may be run through one of the lower tabs 74, through a base plate 90, through an elastomeric material 62 such as silicone, and into the roof 14. At least one of four rigid sidewall panels 72 will include an air inlet passageway 73 that allows air to be drawn into the air filtration system from the surrounding environment. Optionally, the original screws 25 may be removed and the screws 75 may be used secured the flange 24, base plate 90 and lower tabs 74 to the roof 14.

The filter box 80 includes rectangular air filters 82 (three air filters shown) secured together in the shape of a box having four filter sidewalls and a filter top. The filter box 80 has an open bottom so that four filter sidewalls are positionable around the perimeter of the vent fan 20 with the filter top extending over the vent fan, wherein the filter box 80 is configured to avoid interfering with opening and closing of the vent fan cover 38 that is coupled to the vent fan 20. The rigid outer cover can be opened (i.e., the top panel 71 may be opened or removed) for receiving the filter box 80 and can be securely closed to retain the filter box in an operable position. The rigid outer cover 70 is configured to extend over and around the filter box 80 leaving an air flow space surrounding the filter box with the filter box in the operable position, with the rigid outer cover secured to the mobile unit, and with the rigid outer cover securely closed.

Figure 4B:
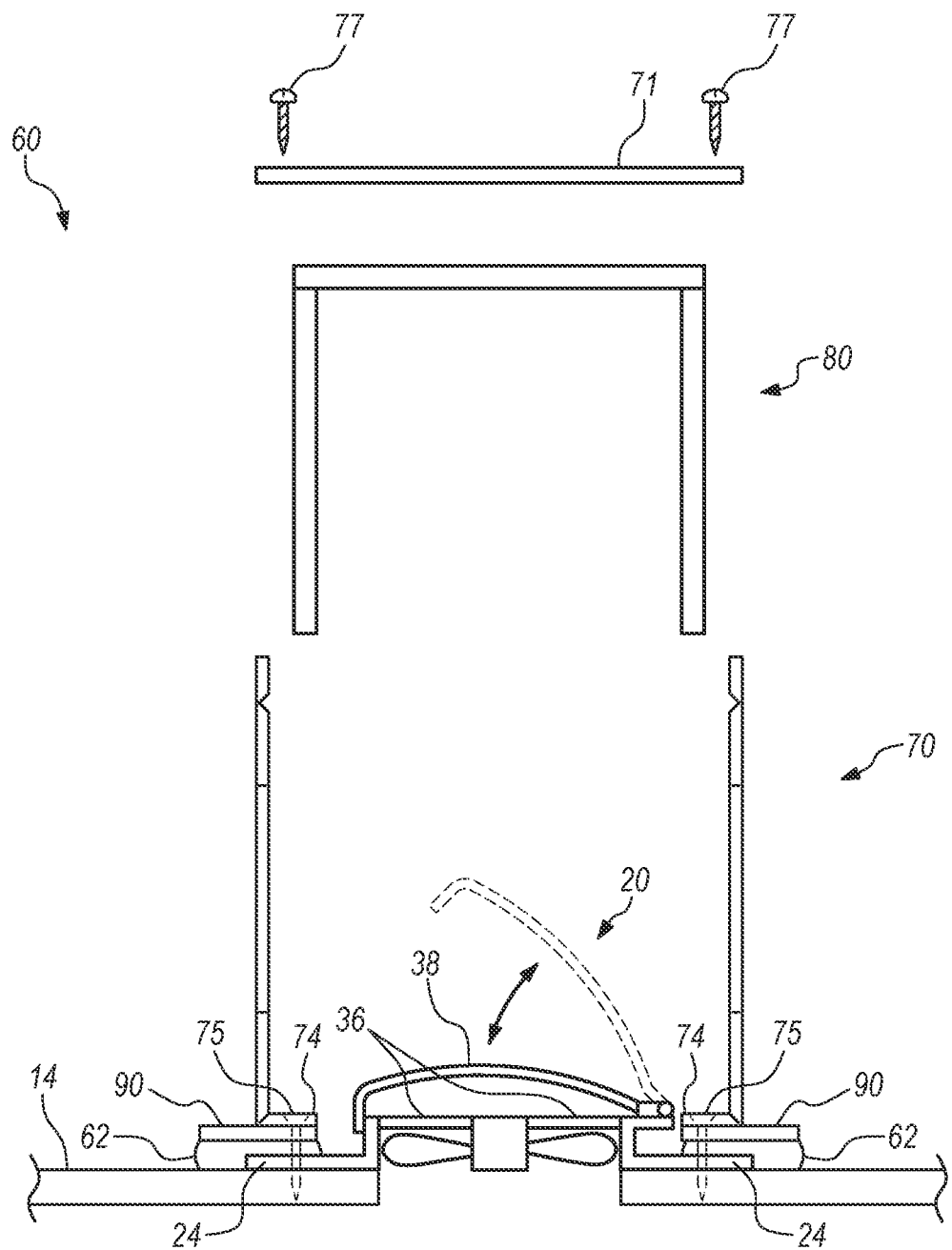
FIG. 4B is a partially exploded schematic side view of the air filtration system of FIG. 4A with the rigid outer cover secured to the roof of the mobile unit.

FIG. 4B is a partially exploded schematic side view of the air filtration system 60 of FIG. 4A with the rigid outer cover 70 secured to the roof 14 of the mobile unit. A set of screws 75 are made to penetrate the lower tabs 74, the base plate 90, the flange 24, and the elastomeric material 62 before engaging the roof 14. In one option, the screws 75 may be made to self-countersink into the lower tabs 74 in order to leave an even top surface of the lower tabs 74 upon which the filter box 80 may sit. An even top surface may improve the stability of the filter box 80 and reduce air gaps that might allow air to bypass the filter box 80.

Figure 4C:
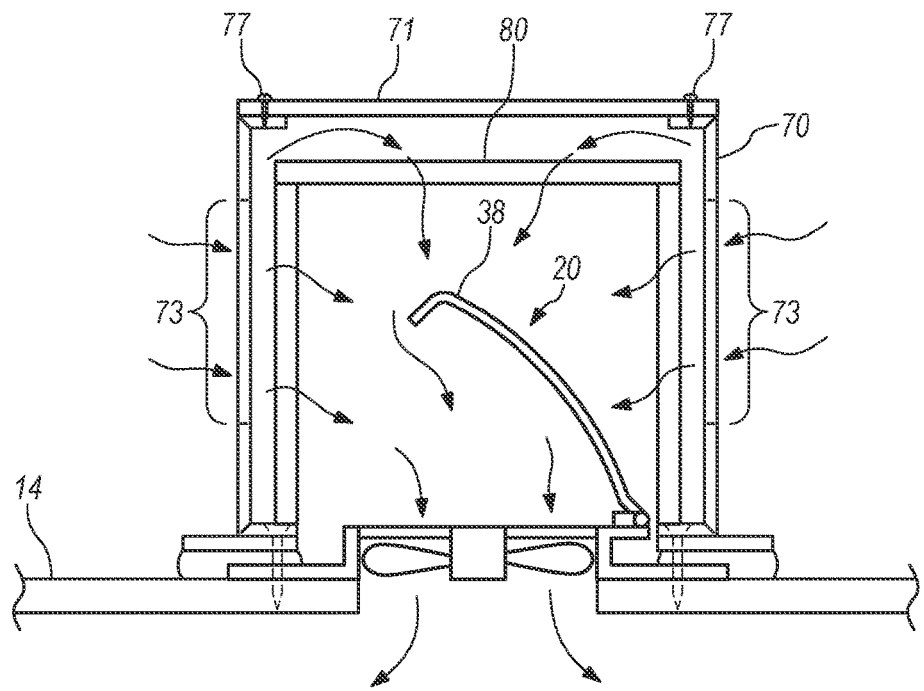
FIG. 4C is a schematic side view of the air filtration system of FIG. 4B with the filter box and top member in an operative condition.

FIG. 4C is a schematic side view of the air filtration system 60 of FIG. 4B in an operative condition. The filter box 80 has been positioned inside the rigid outer cover 70 and the top panel 71 has been secured to the sidewall panels of the rigid outer cover 70. In the embodiment shown, the top panel 71 is secured to upper tabs 79 of each sidewall panel of rigid outer cover 70 using a set of screws 77 around the perimeter of the top panel 71. Alternatively, the top panel 71 may be secured to the sidewall panels of the rigid outer cover 70 using an angle bar as shown in FIG. 9B. Optionally, such an angle bar may be used in each of the four corners of the rigid outer cover 70 and at a midpoint of each of the four lateral sidewall panels.

In reference to FIG. 4C, air is shown (illustrated as wavy lines) passing through the air inlet passageways 73 of the rigid outer cover 70, through any or all of the filters of the filter box 80, then through the vent fan 20 to the interior space of mobile unit below the roof 14. Accordingly, all of the air entering the interior space has been filtered to remove solids.

It should be noted that the vent fan cover 38 is in the open position to allow air to pass through the vent fan 20, yet the filter box 80 does not interfere with the movement of the vent fan cover 38 between the open position and the closed position. In addition, the filter box 80 covers the vent fan 20 such that substantially all of the air drawn through the vent fan 20 into the interior space must pass through the filter media of one of the air filters that form the filter box 80.

Figure 5A:
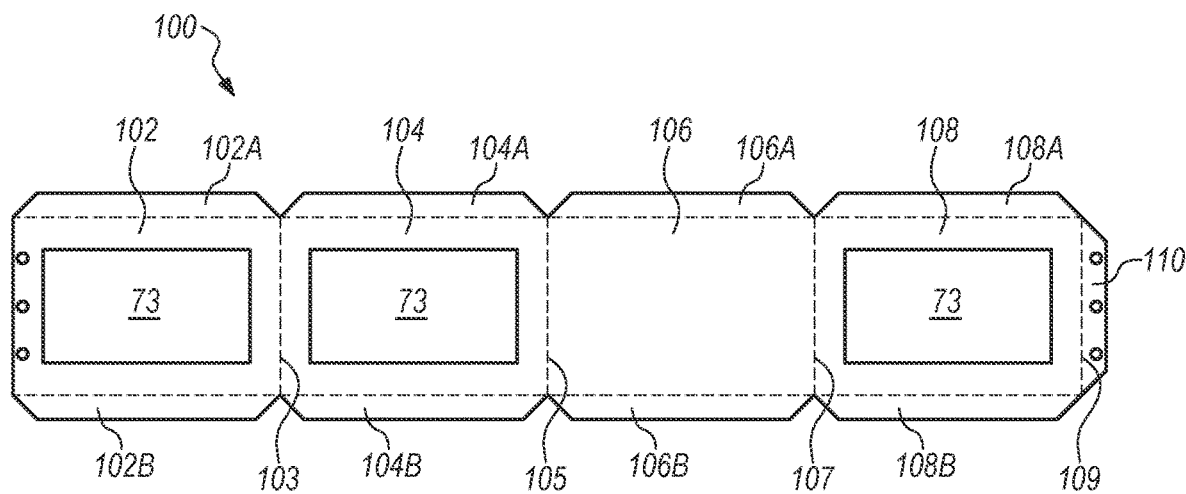
FIG. 5A is a schematic plan view of a net for forming four lateral sidewalls of the rigid outer cover.
Figure 5B:
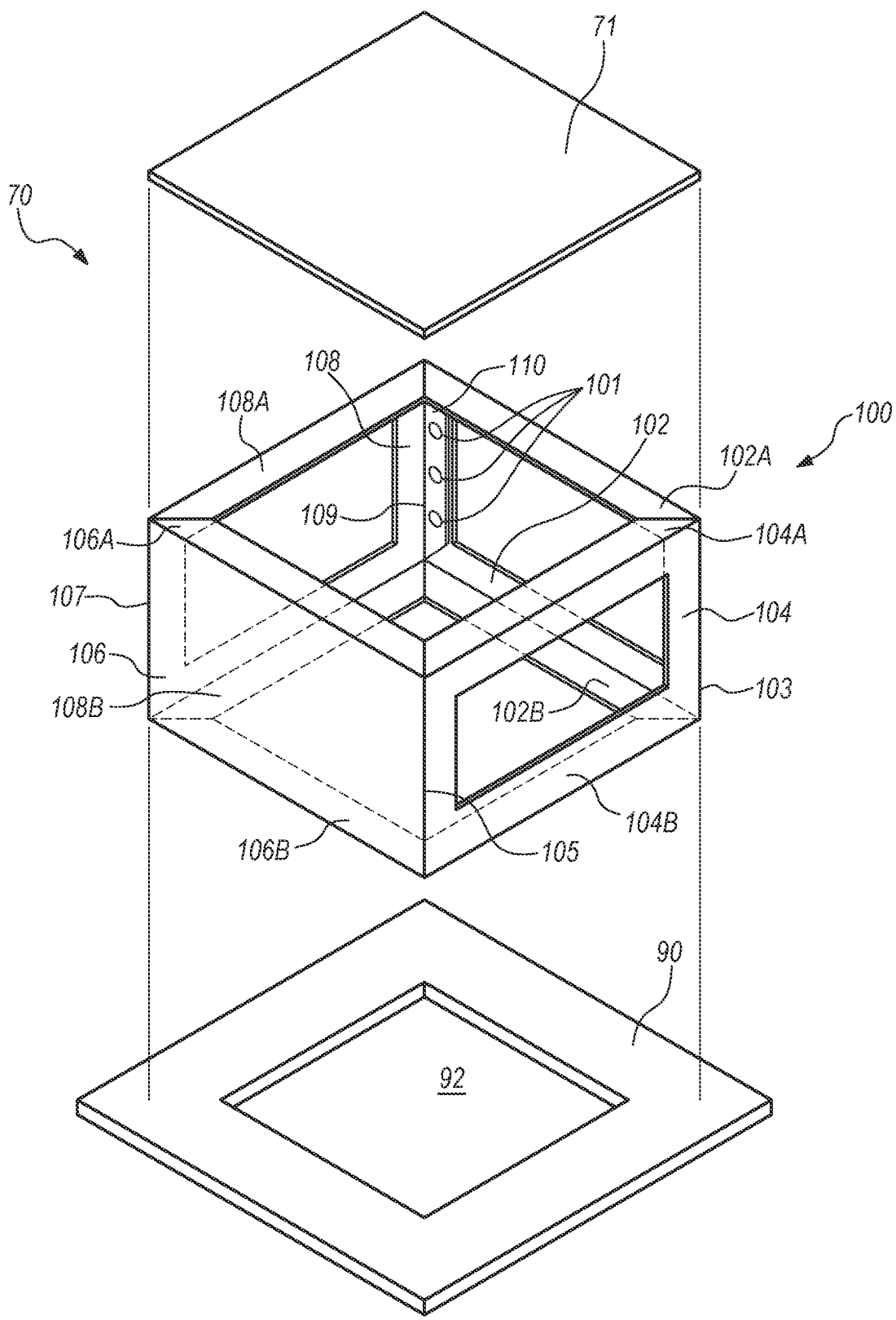
FIG. 5B is an exploded perspective view of the components of the rigid outer cover.
Figure 8:
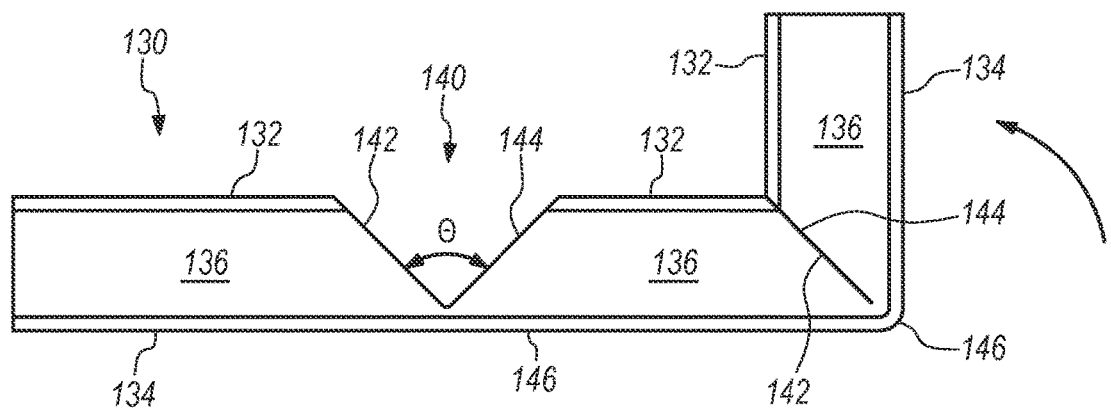
FIG. 8 is a schematic side view of an aluminum composite panel (ACP).

FIG. 5A is a schematic plan view of a net 100 for forming four lateral sidewall panels of the rigid outer cover 70 (see FIG. 5B). An inside face of the net 100 is shown, where a plurality of V-shaped grooves are illustrated as dashed lines. A cross-sectional profile of a V-shaped groove is shown in FIG. 8. Such V-shaped grooves each extend into a major portion of the thickness of the sheet-like material, such as an aluminum core panel, so that the sheet-like material will bend while remaining intact. Accordingly, each V-shaped groove (along the dashed lines) follows a straight line referred to as a "fold line."

The net 100 includes four sidewall panels, including a first sidewall panel 102 having an air inlet passageway 73, a second sidewall panel 104 having an air inlet passageway 73, a third sidewall panel 106 without an air inlet passageway, and a fourth sidewall panel 108 having an air inlet passageway 73. Each of the sidewall panels 102, 104, 106, 108 is delineated from each adjacent sidewall panel by a fold line therebetween. Specifically, the first sidewall panel 102 is foldably connected to the second sidewall panel 104 along a first (vertical) fold line 103, the second sidewall panel 104 is foldably connected to the third sidewall panel 106 along a second (vertical) fold line 105, and the third sidewall panel 106 is foldably connected to the fourth sidewall panel 108 along a third (vertical) fold line 107. Still further, the net 100 may include an end tab 110 that is foldably connected to the fourth sidewall panel 108 by a fourth (vertical) fold line 109. The end tab 110 and the first sidewall panel 102 have a set of three holes that are alignable for receiving fasteners, such as pop rivets, to secure the end tab 110 to the first sidewall panel 102.

Each of the sidewall panels 102, 104, 106, 108 may have one or more tabs extending therefrom, such as an upper tab 102A, 104A, 106A, 108A, respectively, and/or a lower tab 102B, 104B, 106B, 108B, respectively. Each tab is foldably connected to a respective one of the sidewall panels 102, 104, 106, 108 along a (horizontal) fold line therebetween.

FIG. 5B is an exploded perspective view of the components of the rigid outer cover 70 and a base plate 90. The rigid outer cover 70 includes both the top panel 71 and the lateral sidewall panels form by folding the net 100 of FIG. 5A. Each of the fold lines (both vertical and horizontal) shown in FIG. 5A have been folded to arrive at the configuration of the lateral sidewalls shown in FIG. 5B. Accordingly, the net 100 may be described as being in an "expanded configuration" in FIG. 5B.

The end tab 110 is in face-to-face contact with an edge of the first sidewall panel 102 with the holes in the end tab 110 (shown in FIG. 5A) aligned with the holes in the first sidewall panel 102. The fourth sidewall panel 108 may be shorter that the other sidewall panels 102, 104, 106 by the thickness of the panel material, so that the end tab 110 will lay flat against the first sidewall panel 102 while allowing the four sidewall panels to form a rectangle (as viewed from the top).

A pop rivet 101 has been inserted into the aligned holes and deformed to secure the end tab 110 to the first sidewall panel 102 in the configuration shown. Furthermore, the upper tabs 102A, 104A, 106A, 108A have been folded to form upwardly facing surfaces that may be used to secure the top panel 71. Similarly, the lower tabs 102B, 104B, 106B, 108B having folded to form downwardly facing surfaces that may be used to secure the sidewall panels 102, 104, 106, 108 to the base plate 90.

One of the sidewall panels that is without an air inlet passageway, such as sidewall panel 106, may be oriented to face the front of the mobile unit so that the filter box inside the rigid outer cover 70 is not subjected to intense wind and rain caused by driving of the mobile unit.

The top panel 71 may be a simple flat rectangle of the same dimensions as the outer perimeter of the expanded net of sidewall panels. The base plate may have outer dimensions that are greater than those of the expanded net of sidewall panels but has a central opening that fits around at least a portion of the vent fan housing 22 (see FIG. 2). While the central opening 92 is illustrated with sharp internal corners, it may be preferable to provide rounded internal corners to match the shape and dimensions of the upright portion of the vent fan housing 22 or the vent fan flange 24.

Figure 6A:
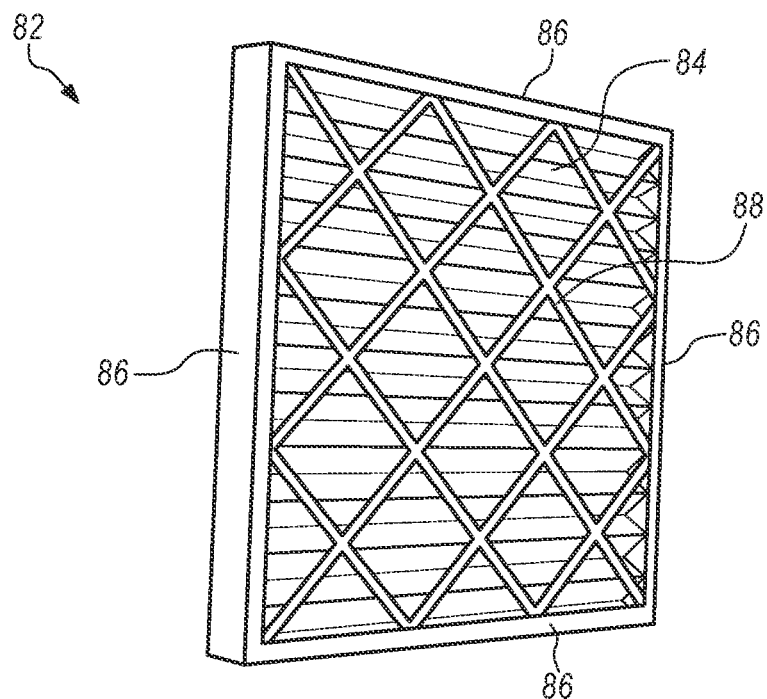
FIG. 6A is a perspective view of a pleated air filter suitable for use in forming a filter box.

FIG. 6A is a perspective view of a pleated air filter 82 suitable for use in forming a filter box. The air filter 82 includes filter media 84 that may be pleated to increase the surface area of the filter media. A cardboard frame 86 is formed around the edges of filter media 84 to provide some structural support for the filter media. Furthermore, a cardboard lattice 88 may be formed integrally with the cardboard frame 86 and may extend across one or both faces (front and back) of the filter media 84 to help retain the filter media and to provide additional structural integrity to the cardboard frame 86. Still further, the air filter may include a metal or plastic mesh (not shown) positioned on a downstream side of the filter media 84 to provide further support for the filter media to oppose the forces associated with airflow passing through the filter media. The air filters 82 are rectangular, but may be square to facilitate formation of the filter box while avoiding the need for multiple unique air filter sizes. One non-limiting example of a suitable air filter has a width of 15 inches, a height of 15 inches, and a depth of 1 inch. The minimum efficiency reporting value (MERV) for a given air filter may be user-selected for the user's particular needs and does not require any change to the disclosed embodiments.

Figure 6B:
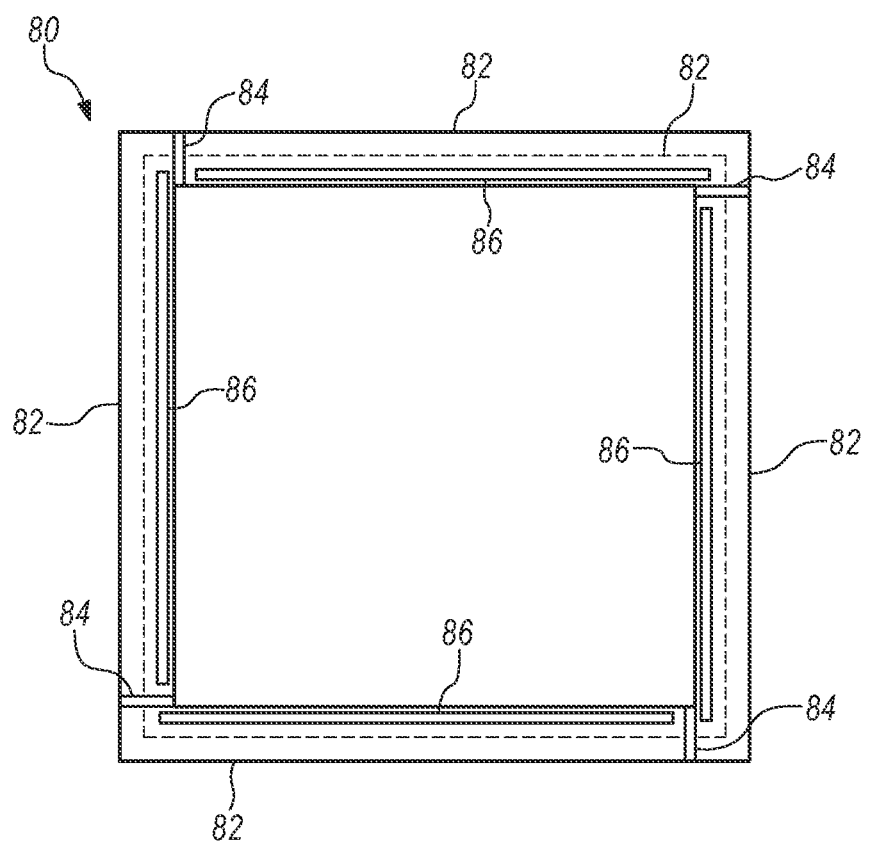
FIG. 6B is a plan view of a filter box including five of the pleated air filters.

FIG. 6B is a plan view (top view) of a filter box 80 including five of the pleated air filters 82. An upper edge of the four lateral sidewall filters 82 are arranged in a rectangular pattern. In the specific option shown, the four lateral sidewall filters 82 are arranged so that their upper edges form a windmill pattern. The windmill pattern includes the rectangular upper edges of the air filter frames 86 forming a perimeter around a central rectangular opening, wherein a side edge of a frame of one air filter 82 abuts an end edge of a frame of an adjacent air filter 82. In the windmill pattern, the resulting filter box 80 may use air filter of the same size to form a rectangular pattern having the same dimensions on each of the four sides of the rectangle. Furthermore, a fifth rectangle air filter 82 (shown in a dashed outline) of the same or other appropriate size may be positioned flat on top of the four lateral sidewall panels 82, for example such that the fifth rectangular air filter 82 will overlap about half the width of the upper edge of each of the four lateral air filters 82. Double-sided tape may be applied between adjacent edges of the air filters, preferably along the entire length of the interface between the air filters. A top edge of four strips of double-sided tape is shown at the four points 84 and four additional strips 86 of double-sided tape are used to secure the frame of the fifth air filter 82.

Figure 6C:
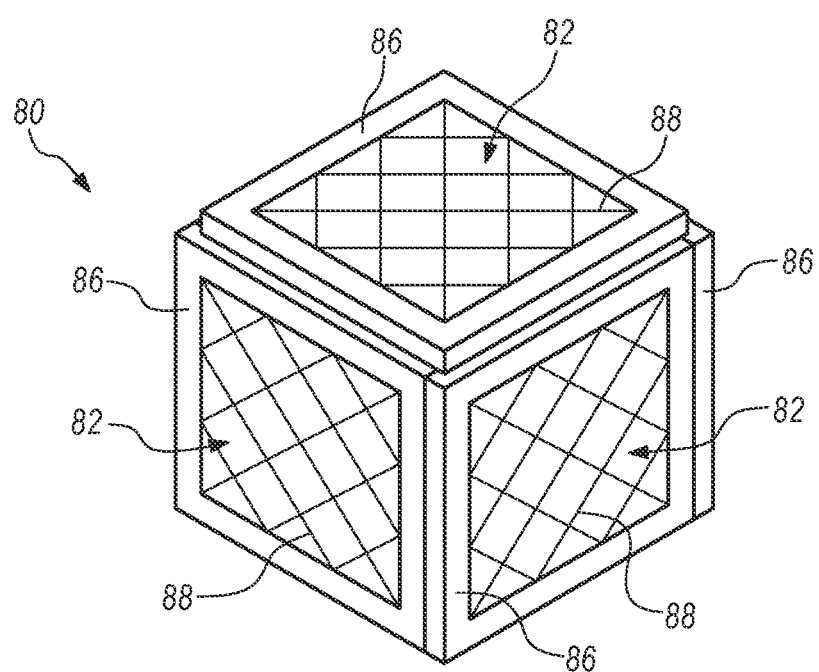
FIG. 6C is a perspective view of the filter box of FIG. 6B.

FIG. 6C is a perspective view of the filter box 80 of FIG. 6B. While this view does not show each of the five air filters 82, the filter box 80 should be considered to be symmetrical. Accordingly, a reverse view of the filter box 80 would look the same as the view shown. The bottom of the filter box is open (i.e., is not closed by an air filter). The air filters 82, cardboard frames 86 and cardboard lattices 88 are labeled for consistency.

Figure 7A:
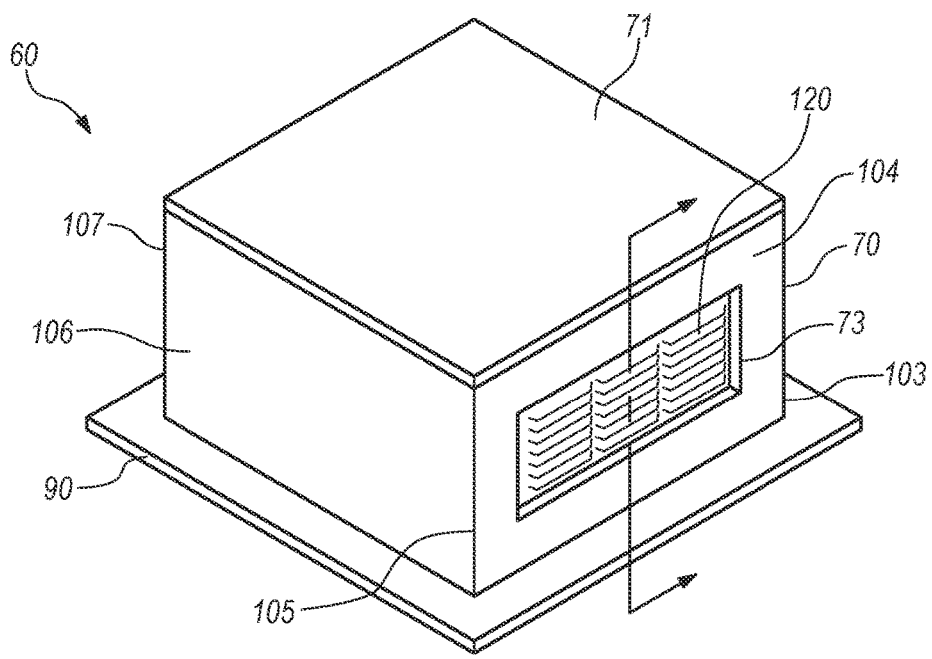
FIG. 7A is a perspective view of an operational air filtration system including louvered screens extending across the side openings in the rigid outer cover.

FIG. 7A is a perspective view of an operational air filtration system 60 including a louvered screen 120 extending across an air inlet passageway 73 in the rigid outer cover 70. A similar louvered screen 120 may extend across or cover each air inlet passageway 73 that is provided in any of the lateral sidewall panels 102, 104, 108 (See FIG. 5B). The sidewall panels 104, 106, air inlet opening 73, and fold lines 103, 105, 107 are labeled for consistency with FIG. 5B.

A louver is a set of horizontal slats that are angled to admit air, but to keep out rain. The angle of the slats may be adjustable or fixed. The rigid outer cover 70 may have an air inlet passageway 73 in one or more of the sidewall panels, where optional screens, grills or other air passageway covers may be used to keep out large bugs, provide structural support to the rigid outer cover 70 and/or shelter the filter box 80 from rain or other physical damage. One example of such a louvered screen 120 is a standard home soffit vent cover.

Figure 7B:
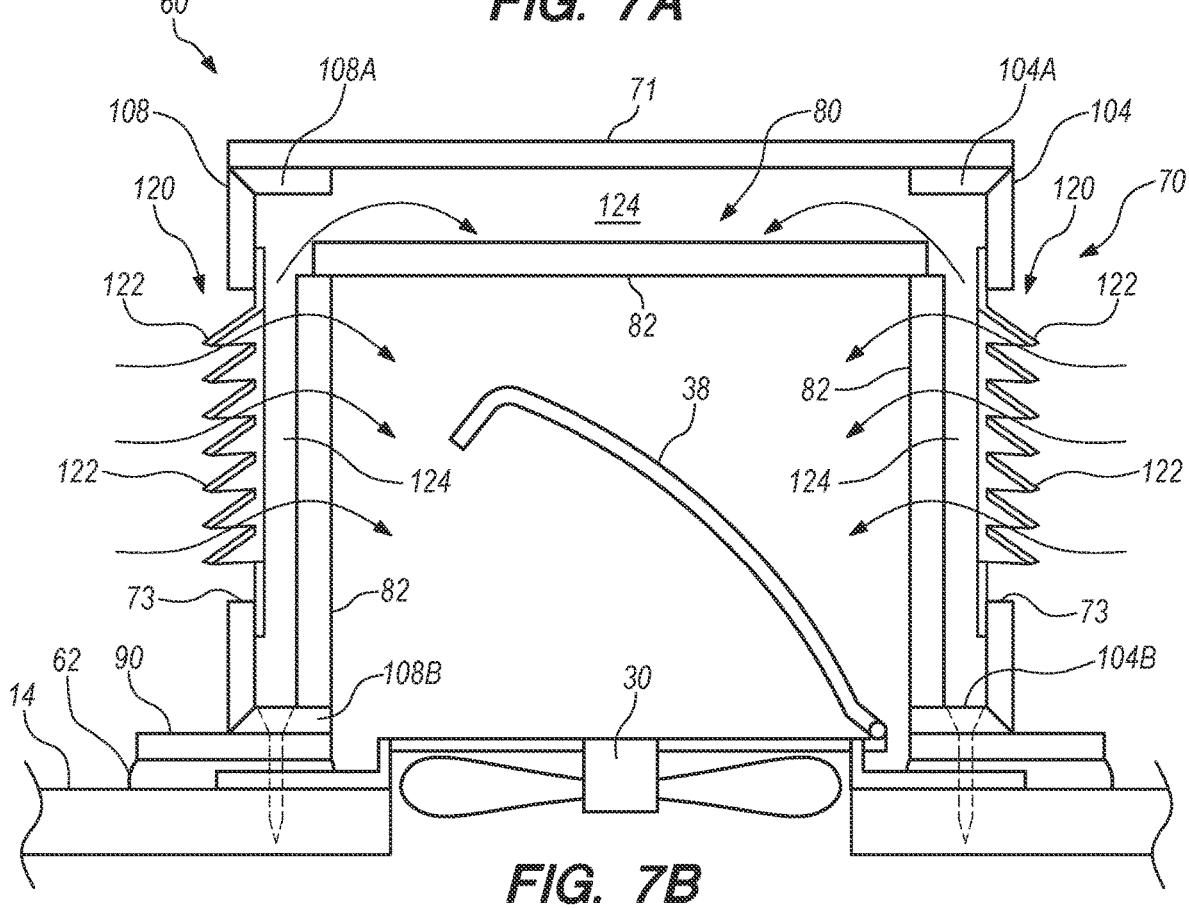
FIG. 7B is a schematic cross-sectional side view of the operational air filtration system of FIG. 7A.

FIG. 7B is a schematic cross-sectional side view of the operational air filtration system 60 of FIG. 7A, where like reference numbers are used to label like parts. Many of the parts are labeled for context. This cross-sectional side view illustrates the downwardly angled slats 122 (nine shown) of the louvered screen 120 having openings therebetween that allow the entry of air into the air filtration system 60. The louvered screen 120 may be secured and/or sealed to an inside face of the sidewall panels 104, 108.

FIG. 7B also illustrates an air gap or space 124 that is provided between the rigid outer cover 70 and the filter box 80 disposed within the rigid outer cover 70. This air gap 124 allow air to be drawn into the rigid outer cover 70 through the air inlet passageways 73 of the sidewall panels, yet the air may be distributed over the full area of the filter media of the filter box 80.

FIG. 8 is a schematic side view of an aluminum composite panel (ACP) 130. The aluminum composite panel 130 has a first aluminum sheet 132, a second aluminum sheet 134, and a polymeric core 136 disposed between the first and second aluminum sheets 132, 134 and bonded to the first and second aluminum sheets 132, 134 as well. In one option, the aluminum sheets having a thickness of about 3 millimeters, although the thickness may have any desired thickness. Non-limiting examples of the polymeric core include polyethylene and polyurethane. Furthermore, the polymeric core may be a dense solid, a solid foam, or a honeycomb structure oriented between the two aluminum sheets to provide a high crush strength.

A V-shaped groove 140 has been cut into one side of the aluminum composite panel 130 such that a portion of the first aluminum sheet 132 and the polymeric core 136 have been removed. However, care should be taken to avoid cutting into the second aluminum sheet 134 and it may be preferred to leave just a small amount of the polymeric core as a margin of safety. The V-shaped groove 140 may form a first exposed face 142 and a second exposed face 144. A linear V-shaped groove 140 (in and out of the page) will form a fold line, such that the aluminum composite panel 130 may be folded at point 146 (i.e., an axis in and out of the page at point 146). The illustrated V-shaped groove 140 forms a right angle θ. A second V-shaped groove 140 was formed to the right, but is illustrated after having been folded about point 146 until the first and second exposed faces 142, 144, are in contact or flush. Such a V-shaped groove 140 may be used to form each of the fold lines in FIG. 5A or each of the fold lines in other embodiments.

Figure 9A:
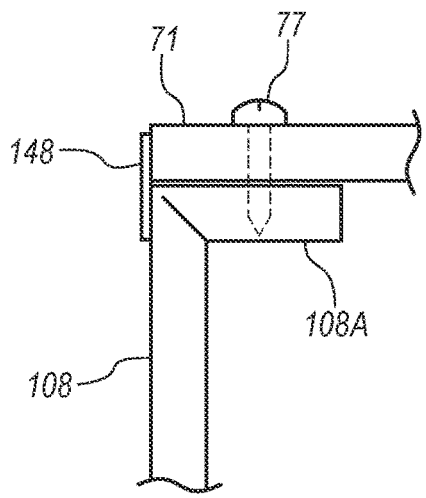
FIG. 9A is a schematic side view of a sidewall panel and a top member secured together with screw.
Figure 9B:
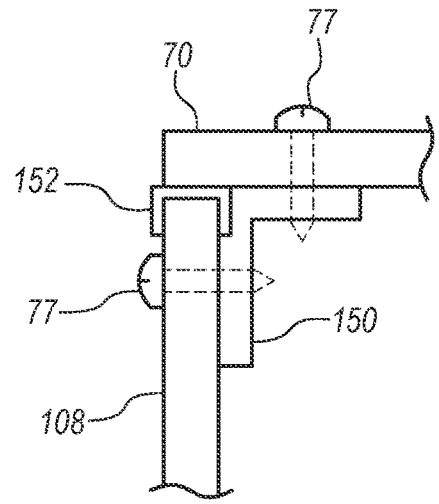
FIG. 9B is a schematic side view of a sidewall panel and a top member secured together with an L-shaped bracket and a pair of screws.

FIG. 9A is a schematic side view of an upper edge of the sidewall panel 108 and a top panel 71 secured together with a screw 77. The upper tab 108A is folded over to form an upwardly-facing shoulder upon which the top panel 71 can be supported and secured. An optional tape 148 may be applied over the external interface between the top panel 71 and the sidewall panel 108 in order to weatherize against water intrusion into the rigid outer cover.

FIG. 9B is a schematic side view of an upper edge of the sidewall panel 108 and a top panel 71 secured together with an L-shaped bracket 150 and screws 77. The L-shaped bracket 150 may initially be secured to the sidewall panel 108 with screws 77 (only one shown) so that a first leg of the bracket 150 is held against the inside surface of the sidewall panel 108 along the upper edge of the sidewall panel 108. As a result, the second leg of the bracket 150 is positioned horizontally and flush with the upper edge of the sidewall panel 108. The top panel 71 may then be similarly connected to the second leg of the bracket 150 with a screw 77.

Figure 9C:
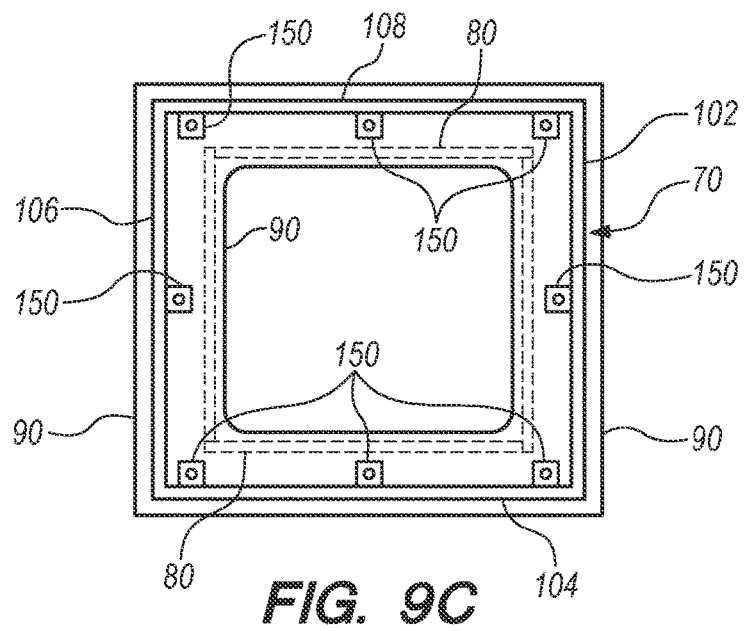
FIG. 9C is a plan view of four lateral sidewall of a rigid outer cover illustrating placement of a plurality of L-shaped brackets according to some embodiments.

FIG. 9C is a plan view of the rigid outer cover 70 illustrating placement of a plurality of the L-shaped brackets 150 shown in FIG. 9B according to some embodiments. In addition to the L-shaped brackets 150, FIG. 9C illustrates the relative position of the base plate 90 extending under the rigid outer cover 70 and the filter box 80 (illustrated in dashed lines). The rigid outer cover 70 includes the four lateral sidewall panels 102, 104, 106, 108. A plurality of the L-shaped brackets 150 are secured to the inside of the four lateral sidewall panels along an upper edge of each lateral sidewall panel consistent with FIG. 9B. In the embodiment shown, there is one L-shaped bracket 150 located in each of the four corners of the rigid outer cover 70 and there is one L-shaped bracket 150 located at a mid-point along each of the four lateral sidewall panels 102, 104, 106, 108 of the rigid outer cover 70. Accordingly, a top panel, such as the top panel 71 shown in FIG. 7A, may be secured to the four lateral sidewall panels 102, 104, 106, 108 using eight (8) screws run through the top panel 71 and into the threaded hole in each L-shaped bracket 150. It should be recognized that L-shaped brackets 150 may be used as a substitute for the upper tabs 102A, 104A, 106A, 108A, lower tabs 102B, 104B, 106B, 108B, and end tab 110 show in FIG. 5B. FIGS. 9A and 9B illustrate how such a tab (i.e., tab 108A in FIG. 9A) may be substituted with an L-shaped bracket (i.e., L-shaped bracket 150 in FIG. 9B).

Figure 10A:
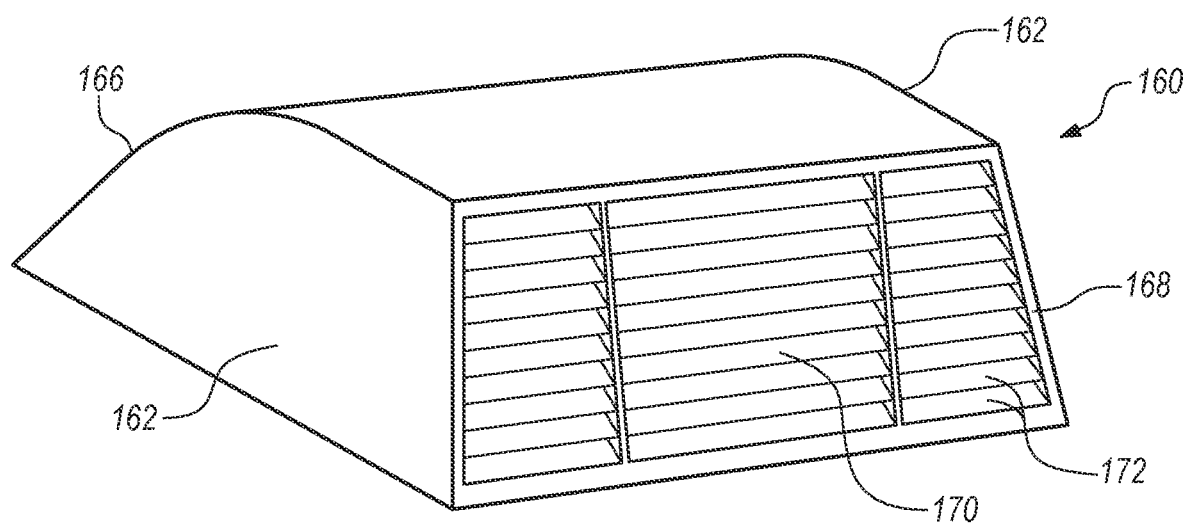
FIG. 10A is a perspective view of a molded plastic embodiment of a rigid outer cover.

FIG. 10A is a perspective view of a molded plastic embodiment of a rigid outer cover 160. The rigid outer cover 160 may have a variety of shapes and contours, but is shown with generally upright sides 162, 164 and a sloped front 166 having no air inlet passageways, and a rear face 168 that forms a louver 170. The louver 170 includes a set of ten slats 172 arranged in series across a major portion of the rear face. The configuration and purpose of the louver 170 is similar to the louver 120 in FIG. 7B, except that the louver 170 may be integrally formed as part of the molded plastic rigid outer cover 160.

Figure 10B:
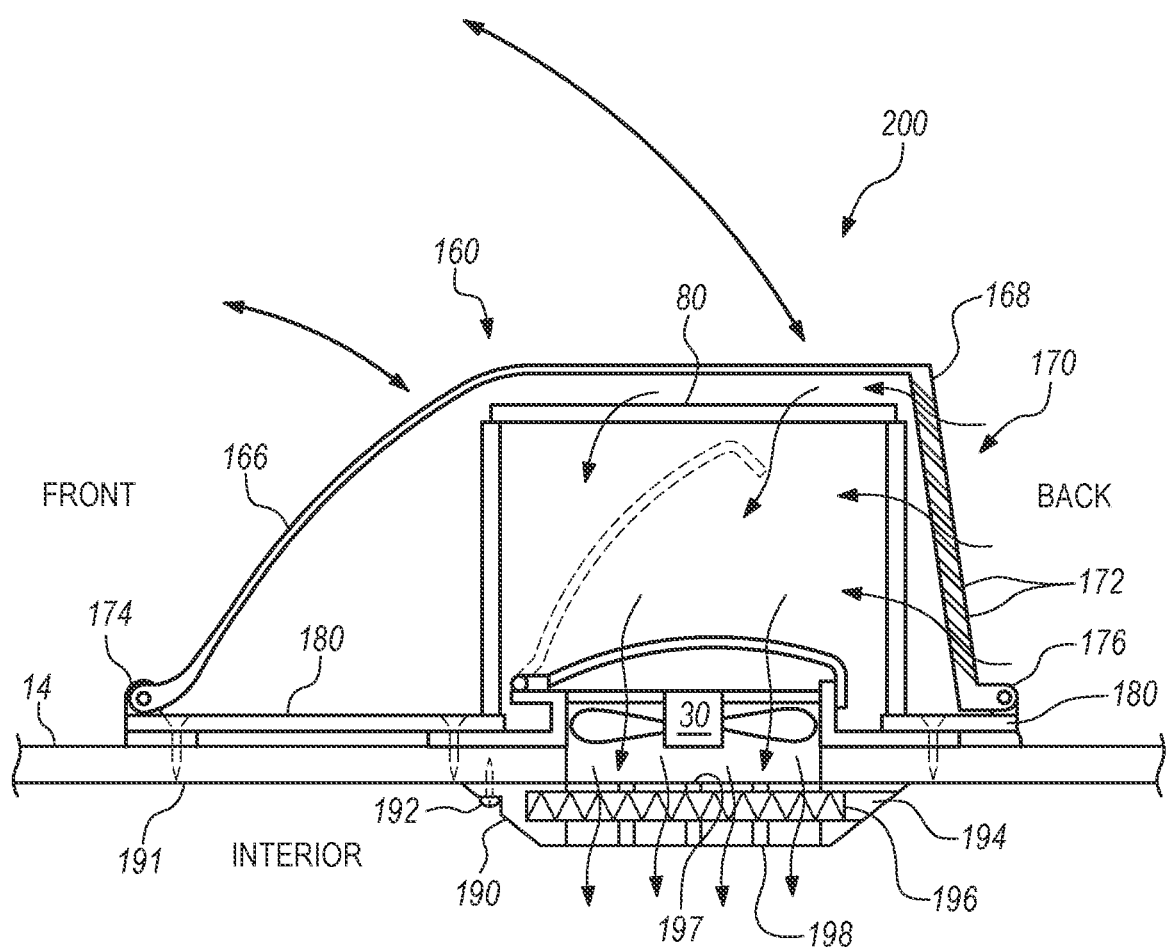
FIG. 10B is a schematic side view of the rigid outer cover of FIG. 10A hingedly connected to the base plate and a secondary filter housing on the outlet side of the vent fan.

FIG. 10B is a schematic side view of an air filtration system 200 in which the rigid outer cover 160 of FIG. 10A is connected to the base plate 90 and a secondary filter housing 190 on the outlet side of the vent fan 30. A hinge 174 secures a front portion of the cover 160 to the base plate 180 and a latch 176, such as a cotter pin coupling, secures a back portion of the cover 160. Accordingly, the rigid outer cover 160 extends over the filter box 80 and protects the filter box 80 from rain and wind. The sloped front 166 will direct air and water up and over the cover 160 as a mobile unit with roof 14 travels forward down a roadway.

The rear face 168 include the louver 170 having upwardly and inwardly (or downwardly and outwardly) angled slats 172 that prevent most rainwater from getting inside the cover 160. However, the louver 170 allow air to pass between the angled slats 172 and into the space under the cover 160. When the vent fan 30 is being run to draw air from the surrounding environment, the outside air passed through the louver 170 and any large bugs, pieces of trash or leaves are prevented from entering under the cover 160. After passing through the louver 170, the outside air is filtered through the air filter 80 and drawn into the vent fan 30.

In the embodiment shown, the air filtration system 200 further includes a secondary filter housing 190 on the outlet side of the vent fan 30. The secondary filter housing 190 may be secured to the ceiling 191 of the mobile unit with a set of screws 192 (only one shown) around the perimeter of the housing 190. Furthermore, the housing 190 may have a port 194 for inserting and removing a secondary air filter 196. In a fully inserted and operable position (as shown), the secondary air filter 196 may be supported between an upper screen 197 and a lower screen or grill 98 that allows air to pass therethrough.

The filter box 80 may be replaced by releasing the latch 176 and rotating the rigid outer cover 160 upward and forward about the hinge 174. After removing the old filter box and inserting a new filter box 80, the rigid outer cover 160 may be rotated back and downward about the hinge 174 and secured in a closed position with the latch 176. Even with the rigid outer cover 160 closed as shown, this embodiment provides an air flow gap between the cover 160 and the filter box 80 so that air may circulate around all sides of the filter box 80 and pass through the filter media in any of the five air filters.

Figure 11:
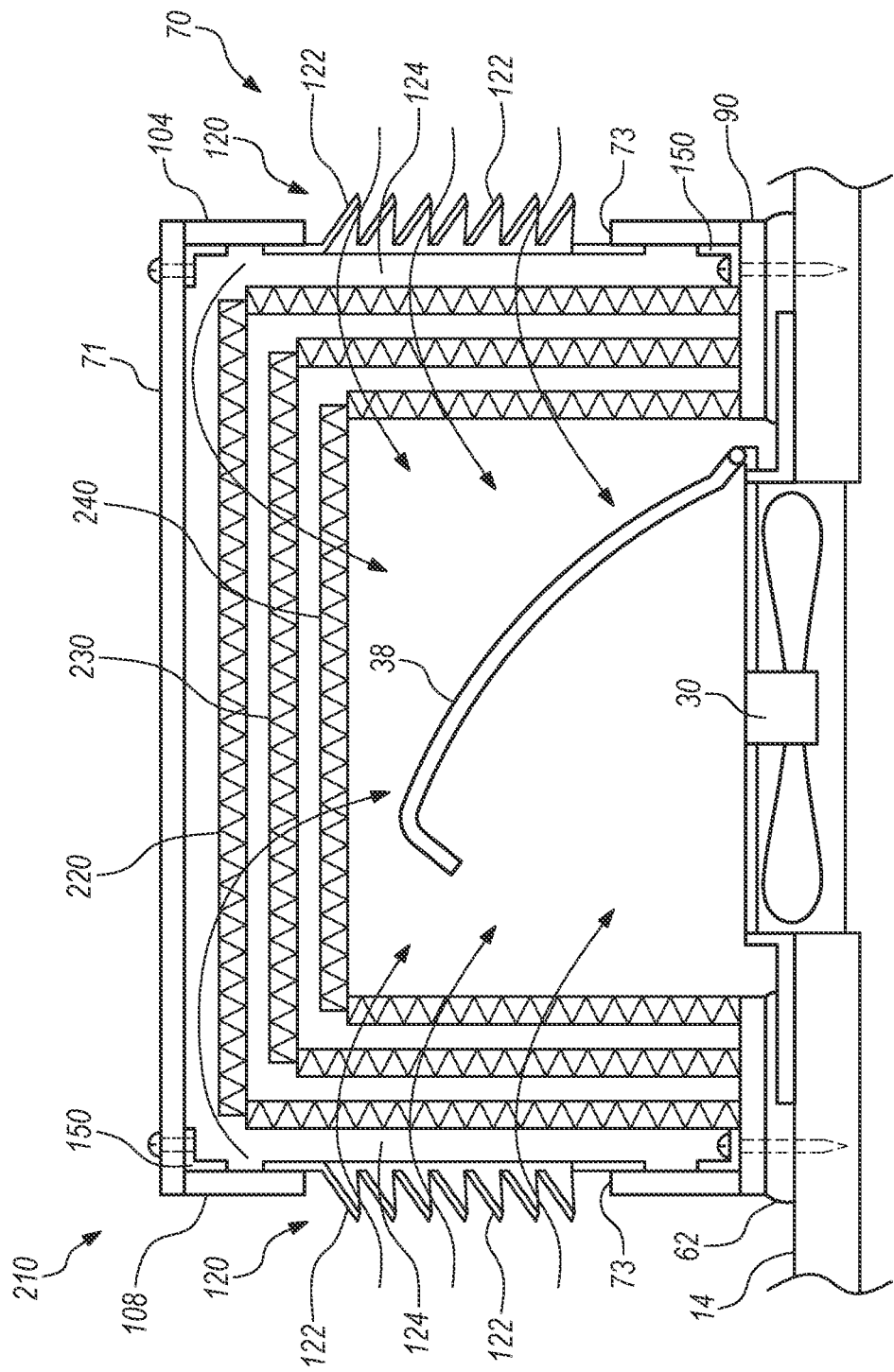
FIG. 11 is a schematic cross-sectional side view of an operational air filtration system having nested filter boxes.

FIG. 11 is a schematic cross-sectional side view of an operational air filtration system 210 having three nested filter boxes 220, 230, 240. The outer filter box 220, the middle filter box 230, and the inner filter box 240 are nested, one inside the other so that air flows sequentially through the three filter boxes from the outside to the inside. In one non-limiting example, the outer filter box may be made with MERV 4 air filters, the middle filter box may be made with MERV 10 air filters, and the inner filter box may be made with HEPA air filters. As shown, the rigid outer cover or cover 70 has sufficient dimensions to accommodate the three filter boxes 220, 230, 240 therein. Optionally, the filter boxes have sufficient dimensions to avoid interfering with the operation of the vent fan 30 and the vent fan cover 38. In such a configuration, it is unnecessary to remove and/or disable the vent fan cover, although this is an option. In a further option, any one or more of the filter boxes may be made in a manner described in reference to FIGS. 6A-6C, although the individual filters 82 may differ in size along the sides and top to form any shape and/or size of rectangular filter box 220, 230, 240.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. An air filtration system for a mobile unit having a vent fan secured to a roof of the mobile unit, wherein the vent fan includes a vent fan housing, a vent fan cover and a perimeter flange around the vent fan housing, comprising:

a flat base plate having a central opening that is positionable around a perimeter of the vent fan housing and over a top of the perimeter flange, wherein the flat base plate is secureable to the mobile unit with screws having a length to extend through the flat base plate, through the perimeter flange, and into the roof of the mobile unit;

a filter box including five rectangular air filters secured together in the shape of a box having four filter sidewalls and a filter top, wherein the filter box has an open bottom so that the four filter sidewalls are positionable around the vent fan housing with the filter top extending over the vent fan and the four filter sidewalls configured to sit flush on top of the flat base plate, and wherein the filter box is configured to avoid interfering with opening and closing of the vent fan cover; and a rigid outer cover having a bottom edge that is hingedly secured to the flat base plate with the rigid outer cover extending over the vent fan, wherein the rigid outer cover is configured to receive the filter box in an operable position with a lower edge of the filter box flush against the flat base plate while avoiding interference with opening and closing of the vent fan cover, wherein the rigid outer cover includes an air inlet passageway to an air flow space between the rigid outer cover and the filter box, and wherein the rigid outer cover can be opened for receiving the filter box and can be securely closed to retain the filter box in an operable position.

2. The air filtration system of claim 1, wherein each of the five rectangular air filters are rectangular air filters having the same nominal dimensions.

3. The air filtration system of claim 1, wherein the screws that are used for securing the flat base plate to the mobile unit have a flat countersunk head style that allows the filter box to sit flush against the flat base plate regardless of screw placement.

4. The air filtration system of claim 1, wherein the rigid outer cover has rigid rectangular sidewalls, a rigid rectangular top and an open bottom.

5. The air filtration system of claim 4, wherein the rigid outer cover is made with an aluminum composite material having a first aluminum sheet, a second aluminum sheet, and a polymeric core secured between the first and second aluminum sheets.

6. The air filtration system of claim 4, wherein rigid rectangular top is detachably secured to the four rigid sidewalls with a plurality of fasteners.

7. The air filtration system of claim 1, further comprising:
an elastomeric material disposed between the top of the perimeter flange and a bottom surface of the base plate.

8. The air filtration system of claim 1, further comprising:
a louvered screen extending across the air inlet passageway.

9. The air filtration system of claim 1, wherein the rigid outer cover includes at least one additional air inlet passageway.

10. A mobile unit having an air filtration system secured to a roof of the mobile unit, comprising:

a vent fan including a vent fan housing, a vent fan cover and a perimeter flange around the vent fan housing, wherein the perimeter flange secures the vent fan to the roof of the mobile unit;

a flat base plate having a central opening that is positionable around a perimeter of the vent fan housing and over a top of the perimeter flange, wherein the flat base plate is secured to the mobile unit with screws extending through the flat base plate, through the perimeter flange, and into the roof of the mobile unit;

a filter box including five rectangular air filters secured together in the shape of a box having four filter sidewalls and a filter top, wherein the filter box has an open bottom so that the four filter sidewalls are positionable around the vent fan housing with the filter top extending over the vent fan and the four filter sidewalls configured to sit flush on top of the flat base plate, and wherein the filter box is configured to avoid interfering with opening and closing of the vent fan cover; and a rigid outer cover having a bottom edge that is hingedly secured to the flat base plate with the rigid outer cover extending over the vent fan, wherein the rigid outer cover is configured to receive the filter box in an operable position with a lower edge of the filter box flush against the flat base plate while avoiding interference with opening and closing of the vent fan cover, wherein the rigid outer cover includes an air inlet passageway to an air flow space between the rigid outer cover and the filter box, and wherein the rigid outer cover can be opened for receiving the filter box and can be securely closed to retain the filter box in an operable position.

11. The mobile unit of claim 10, wherein each of the rectangular air filters has a cardboard frame that is secured to a cardboard frame of an adjacent one of the air filters.

12. The mobile unit of claim 11, wherein the cardboard frame of each of the air filters has a flat surface that is positioned flush with a flat surface of the cardboard frame of each adjacent air filter, and wherein the cardboard frames are secured together with double-sided tape.

13. The mobile unit of claim 10, further comprising:
an elastomeric material disposed between the top of the perimeter flange and a bottom surface of the base plate.

14. The mobile unit of claim 10, wherein the rigid outer cover is made with an aluminum composite material having a first aluminum sheet, a second aluminum sheet, and a polymeric core secured between the first and second aluminum sheets.

15. The mobile of claim 10, further comprising:
a louvered screen extending across the air inlet passageway.

16. The mobile unit of claim 10, wherein the air inlet passageway is back-facing relative to a forward direction of the mobile unit.

17. The mobile unit of claim 16, wherein the rigid outer cover includes first and second lateral sides that each include an additional air inlet passageway.

18. The mobile unit of claim 17, wherein each air inlet passageway includes a louvered screen.

* * * * *